(12) United States Patent
Nayak et al.

(10) Patent No.: US 12,114,271 B2
(45) Date of Patent: Oct. 8, 2024

(54) POWER OPTIMIZATION FOR FREQUENT SERVICE LOSS

(71) Applicant: Google LLC, Mountain View, CA (US)

(72) Inventors: Shivank Nayak, Milpitas, CA (US); Srinivas Vangaru, Mountain View, CA (US); Siddharth Ray, Palo Alto, CA (US); Qin Zhang, Mountain View, CA (US)

(73) Assignee: Google LLC, Mountain View, CA (US)

( * ) Notice: Subject to any disclaimer, the term of this patent is extended or adjusted under 35 U.S.C. 154(b) by 476 days.

(21) Appl. No.: 17/596,597

(22) PCT Filed: Jun. 28, 2019

(86) PCT No.: PCT/US2019/039774
§ 371 (c)(1),
(2) Date: Dec. 14, 2021

(87) PCT Pub. No.: WO2020/263269
PCT Pub. Date: Dec. 30, 2020

(65) Prior Publication Data
US 2022/0346031 A1 Oct. 27, 2022

(51) Int. Cl.
*H04W 52/24* (2009.01)
*H04W 48/16* (2009.01)
*H04W 52/02* (2009.01)

(52) U.S. Cl.
CPC ......... *H04W 52/245* (2013.01); *H04W 48/16* (2013.01); *H04W 52/0229* (2013.01); *H04W 52/0238* (2013.01); *H04W 52/0267* (2013.01)

(58) Field of Classification Search
CPC ............... H04W 52/245; H04W 48/16; H04W 52/0229; H04W 52/0238; H04W 52/0267;
(Continued)

(56) References Cited

U.S. PATENT DOCUMENTS 8,427,942 B2 * 4/2013 Kim .................. H04W 48/16
455/452.2
11,641,584 B1 * 5/2023 Timm .................. H04W 48/20
(Continued)

FOREIGN PATENT DOCUMENTS

WO    2009/146345    12/2009

*Primary Examiner* — Lana N Le
(74) *Attorney, Agent, or Firm* — McDonnell Boehnen Hulbert & Berghoff LLP

(57) ABSTRACT

Apparatus and methods related to acquiring service on mobile computing devices (MCDs) are provided. A method includes determining a decreasing sequence of scan ratios, each scan ratio indicating a proportion of time over which a MCD scans one or more frequencies to attempt connection with a wireless network during a disconnected time window. The method further includes determining a connected time window' when the MCD is connected to the wireless network. The method additionally includes determining a ping-pong rate for the MCD based at least on a duration of the connected time window. The method also includes selecting a scan ratio from the decreasing sequence of scan ratios based on the ping-pong rate. The method further includes scanning the one or more frequencies in accordance with the decreasing sequence of scan ratios and starting from the selected scan ratio to cause the MCD to attempt connection with the wireless network.

18 Claims, 8 Drawing Sheets

(58) Field of Classification Search
CPC ... H04W 24/02; H04W 48/20; H04W 36/302; H04W 36/0022; H04W 52/267; H04W 52/0261; H04W 52/0216; H04W 36/14; H04W 8/005; H04W 48/18; H04W 52/0219; H04W 72/0453; H04W 72/12; H04W 36/324; Y02D 30/70; H03J 1/0091; H03J 7/32; H03J 1/005; H03J 7/047; H04B 7/12; H04B 1/005; H04B 1/006; H04B 17/309; H04B 7/265; H04B 1/7156

See application file for complete search history.

(56) References Cited

U.S. PATENT DOCUMENTS

| | | | |
|---|---|---|---|
| 2008/0233955 A1* | 9/2008 | Narang | H04W 48/20 455/434 |
| 2009/0156206 A1* | 6/2009 | Rathonyi | H04W 48/16 455/434 |
| 2013/0344902 A1 | 12/2013 | Cili et al. | |
| 2015/0079985 A1 | 3/2015 | Vuchula et al. | |
| 2022/0007438 A1* | 1/2022 | Agrawal | H04W 48/18 |

* cited by examiner

| Scanning Context 300 | | |
|---|---|---|
| Attributes 310 | Example Attribute Values 312 | Attribute's Effect on Scanning Profile 314 |
| Mobility | Static, walking, driving | Increase scanning rate as mobility increases |
| Battery | Battery life % | Increase scanning rate as battery life increases |
| Screen activity | Active, inactive | If screen is active, increase scanning rate |
| Thermal | Device temperature in °C (or °F) | Decrease scanning rate as thermal attribute increases |
| Software app | Number of active applications | If one or more applications active, increase scanning rate |
| MRU frequency | MRU frequency value(s) | Select most recently used (MRU) frequency first and/or Change MRU frequency's scan rate |
| Predicted location | Lat./long. of predicted location(s) | Select frequencies based on predicted MCD location |
| Actual location | Lat./long. of actual location | Select frequencies based on actual MCD location |

FIG. 3

POWER OPTIMIZATION FOR FREQUENT SERVICE LOSS

This application is a national stage application under 35 U.S.C. § 371 of International Application No. PCT/US2019/039774, filed Jun. 28, 2019, the disclosure of which is explicitly incorporated by reference herein in its entirety.

BACKGROUND

Many mobile computing devices, including smart phones, can connect to wireless networks to provide data and/or voice services. At some times, though, such mobile computing devices can go "out of service"; that is, become disconnected from some or all previously-connected wireless networks. When a mobile computing device goes out of service, the mobile computing device can attempt to reconnect to some or all of the previously-connected wireless networks. If the mobile computing device is successful, the mobile computing device can go "in service" by reconnecting to one or more of the previously-connected wireless networks to provide data and/or voice services.

SUMMARY

In one aspect, a computer-implemented method is provided. The method includes determining a decreasing sequence of scan ratios, each scan ratio indicating a proportion of time over which a mobile computing device scans one or more frequencies to attempt connection with a wireless network during a disconnected time window when the mobile computing device is disconnected from the wireless network. The method further includes determining a connected time window when the mobile computing device is connected to the wireless network, the connected time window occurring after the disconnected time window. The method additionally includes determining a ping-pong rate for the mobile computing device based at least on a duration of the connected time window. The method also includes selecting a scan ratio from the decreasing sequence of scan ratios based on the ping-pong rate. The method further includes scanning the one or more frequencies in accordance with the decreasing sequence of scan ratios and starting from the selected scan ratio to cause the mobile computing device to attempt connection with the wireless network.

In another aspect, a mobile computing device is provided. The mobile computing device includes one or more processors and one or more computer readable media. The one or more computer readable media have computer-executable instructions stored thereon that, when executed by the one or more processors, cause the mobile computing device to perform functions. The functions include determining a decreasing sequence of scan ratios, each scan ratio indicating a proportion of time over which a mobile computing device scans one or more frequencies to attempt connection with a wireless network during a disconnected time window when the mobile computing device is disconnected from the wireless network. The functions further include determining a connected time window when the mobile computing device is connected to the wireless network, the connected time window occurring after the disconnected time window. The functions additionally include determining a ping-pong rate for the mobile computing device based at least on a duration of the connected time window. The functions also include selecting a scan ratio from the decreasing sequence of scan ratios based on the ping-pong rate. The functions further include scanning the one or more frequencies in accordance with the decreasing sequence of scan ratios and starting from the selected scan ratio to cause the mobile computing device to attempt connection with the wireless network.

In another aspect, a mobile computing device is provided. The mobile computing device includes means for determining a decreasing sequence of scan ratios, each scan ratio indicating a proportion of time over which a mobile computing device scans one or more frequencies to attempt connection with a wireless network during a disconnected time window when the mobile computing device is disconnected from the wireless network. The mobile computing device further includes means for determining a connected time window when the mobile computing device is connected to the wireless network, the connected time window occurring after the disconnected time window. The mobile computing device additionally includes means for determining a ping-pong rate for the mobile computing device based at least on a duration of the connected time window. The mobile computing device also includes means for selecting a scan ratio from the decreasing sequence of scan ratios based on the ping-pong rate. The mobile computing device further includes means for scanning the one or more frequencies in accordance with the decreasing sequence of scan ratios and starting from the selected scan ratio to cause the mobile computing device to attempt connection with the wireless network.

In another aspect, an article of manufacture is provided. The article of manufacture includes one or more computer readable media. The one or more computer readable media have computer-executable instructions stored thereon that, when executed by one or more processors of a mobile computing device, cause the mobile computing device to perform functions. The functions include determining a decreasing sequence of scan ratios, each scan ratio indicating a proportion of time over which a mobile computing device scans one or more frequencies to attempt connection with a wireless network during a disconnected time window when the mobile computing device is disconnected from the wireless network. The functions further include determining a connected time window when the mobile computing device is connected to the wireless network, the connected time window occurring after the disconnected time window. The functions additionally include determining a ping-pong rate for the mobile computing device based at least on a duration of the connected time window. The functions also include selecting a scan ratio from the decreasing sequence of scan ratios based on the ping-pong rate. The functions further include scanning the one or more frequencies in accordance with the decreasing sequence of scan ratios and starting from the selected scan ratio to cause the mobile computing device to attempt connection with the wireless network. A computing program comprising instructions that, when executed by one or more processors, causes the one or more processors to perform functions as described above may also be provided.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

FIG. 3 depicts an example scanning context for connecting a mobile computing device with one or more networks, in accordance with example embodiments.

DETAILED DESCRIPTION

Figure 1:
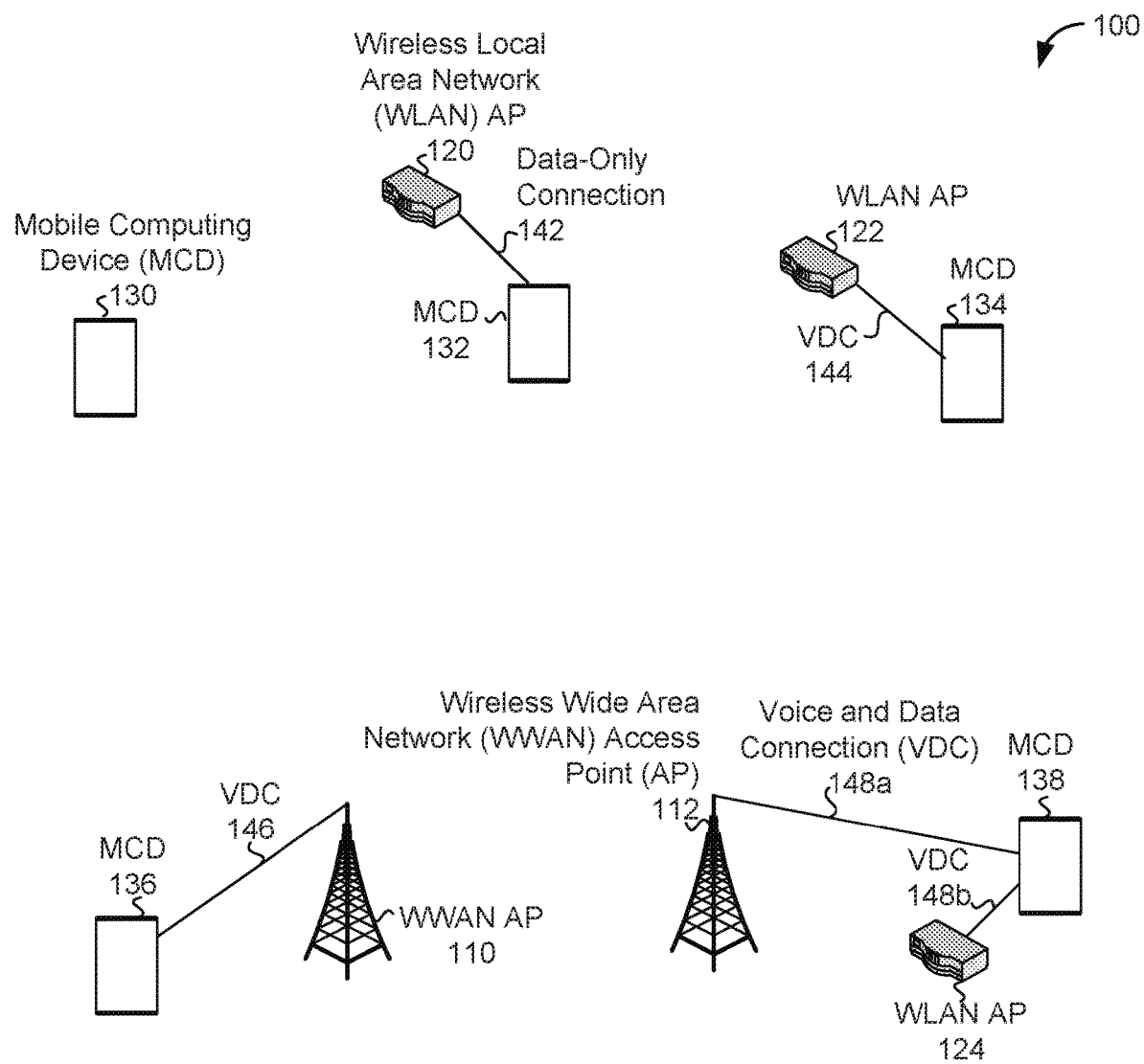
FIG. 1 is a diagram showing connections between mobile computing devices (MCDs) and access points (APs) for wireless networks, in accordance with example embodiments.

Mobile computing devices, such as smartphones or tablets, are frequently connected to one or more wireless networks to provide services, such as data and/or voice services. If a mobile computing device is currently not connected to a wireless network, then that mobile computing device can be called "out of service". In some cases, a mobile computing device can be connected to a network but a particular service, such as voice service or data service, is unavailable—in that case, the mobile computing device can still be classified as out of service with respect to the particular service.

If battery life was not a concern, an out of service mobile computing device could continuously scan one or more frequencies for network access. For example, the mobile computing device may frequently, or repeatedly, perform a scan of a particular frequency by attempting to connect to a particular network using the particular frequency. If the scan is successful, the mobile computing device can "acquire service" or obtain access to one or more services from the particular network.

However, typical mobile computing devices have limited amounts of battery power. Further, a typical mobile computing device uses a significant amount of power when scanning "for service"; that is, when scanning one or more frequencies to connect to one or more wireless networks. In some examples, mobile computing devices use between eight and ten times more power while scanning for service than when idle.

In practice, a tradeoff exists between power consumption in scanning for service and delay in service acquisition. Some out of service scan algorithms balance the time when a device is not scanning for service and the time when the device is scanning, so as to have sufficient performance on both service recovery and power consumption. More specifically, an incremental sleep algorithm can be used in which a mobile computing device scans for service less frequently as out of service time increases. The proportion of a given period of time over which a mobile computing device is scanning for service may be referred to as a scan ratio. A scan ratio may be associated with a sleep duration, where the mobile computing device waits the associated sleep duration in between consecutive scanning periods. As time out of service increases, the mobile computing device may increase this sleep duration. For example, the time spent scanning for service may stay the same while the time spent sleeping increases, thus decreasing the scan ratio.

Once the mobile computing device reacquires service, typical scan algorithms are stopped. The next time the mobile computing device is out of service, the search for coverage then begins anew (e.g., always starting with the same scan ratio). In situations where the mobile computing device is frequently going in and out of coverage, these algorithms may cause the mobile computing device to scan too frequently and consume battery inefficiently.

Described herein are out of service recovery algorithms that enable a mobile computing device to intelligently adjust the scan ratio used when the device is frequently going in and out of service. Power utilization may be optimized by improving a service recovery algorithm's ability to determine when to cause the mobile computing device to scan aggressively.

The proposed solutions include two major aspects. The first aspect involves identifying the extent to which a mobile computing device is frequently going in and out of service by defining a ping-pong rate. The ping-pong rate is representative of the rate at which the mobile computing device is changing between an in service state and an out of service state. The second aspect involves adjusting a service recovery algorithm to take the ping-pong rate into consideration to optimize power consumption.

Regarding the first aspect, the ping-pong rate may be determined based on the duration of the most recent connected time window when the mobile computing device was connected to a service. In general, the longer the duration of the connected time window, the lower the ping-pong rate. In some examples, the ping-pong rate may be determined to fall into one of three classes or buckets: high, medium, or low. In other examples, more or fewer buckets may be used. In further examples, the ping-pong rate may be determined to be a continuous function of the duration of the most recent connected time window. In additional examples, the duration of multiple connected time windows (e.g., the previous three connected time windows) may be considered to determine the ping-pong rate.

Regarding the second aspect, once the ping-pong rate is determined, it may be used to select a starting scan ratio for the mobile computing device. More specifically, the scan ratio may be reset to a particular scan ratio of a decreasing sequence of scan ratios used during the previous disconnected time window when the device was disconnected from service. The decreasing sequence of scan ratios is a sequence where each scan ratio is less than (or in some cases, the same) as a previous scan ratio in the sequence. The ping-pong rate may indicate how far back in the sequence to reset the scan ratio. For instance, a high ping-pong rate may cause the device to continue using the last used scan ratio as if the most recent service reacquisition did not happen. A medium ping-pong rate may instead cause the scan ratio to be reset to a mid-point of the decreasing sequence of scan ratios used during the last disconnected time window. A low ping-pong rate may cause the scan ratio to be reset all the way back to the initial scan ratio of the sequence. In this manner, the recovery algorithm may allow for efficient reductions in scan ratios when the device is frequently going in and out of service.

A stage refers to a fixed period of time during which the mobile computing device attempts connection with a wireless network at an associated scan ratio. For instance, a cycle of scan and sleep actions may be performed repeatedly, in accordance with a given scan ratio, for the duration of the stage. At the end of the stage, the next stage in the sequence may begin with scanning occurring at the next, associated, scan ratio from the sequence of scan ratios. A sequence of stages may be associated with a timer, and resetting the scan ratio to a previous scan ratio may then involve resetting the stage timer to a previous stage timer. During a stage, the device may scan multiple frequencies in sequence. Different scanning rates may be used for each of the frequencies. Each scanning rate may represent a number of connection attempts that the mobile computing device will make to a corresponding frequency per unit time. A stage with a lower scan ratio may have lower scanning rates for particular frequencies, or may continue to scan particular frequencies at the same scanning rate as other stages but simply scan for less time.

Different sequences of scan ratios (or stages) may be used to search through different sets (e.g., databases) of frequencies. For instance, a recovery scan algorithm may include two separate scan types, each with their own scheduled stages and timers. One scan type, an acq_db scan, may search recently found frequencies only. Searching recently found frequencies only may be quicker than searching for all frequencies, and therefore may use less battery during the scan. A second scan type, a full_band scan, may search on all allowed frequency bands. When a scan ratio (or stage timer) is reset for one scan type, it may be reset by a different amount or not at all for a different scan type.

The sequence of scan ratios (or stages) for a particular set of frequencies, as well as how aggressively to reset a scan ratio (or stage timer), may depend on various context information. For example, sensor data, such as mobility-related data, battery-related data, screen status data, and thermal status data can be used to determine a scanning context for the mobile computing device, where the scanning context includes a number of data-driven attributes. For example, the mobility-related data, battery-related data, screen status data, and thermal status data can be used to determine respective mobility, battery, screen activity, and thermal attributes of the scanning context.

The use of mobility-related data can provide advantages over other approaches that assume that a mobile computing device is always mobile, and so has a rapidly changing radio frequency (RF) environment. Under the rapidly changing RF environment assumption, an out of service recovery algorithm may scan for service frequently, which can lead to increased power usage to perform these scans. However, the herein-described out of service recovery algorithm(s) can obtain sensor information, such as location data from location sensors, network connectivity data from network interfaces, and/or motion data from accelerometers, to determine a mobility attribute. The herein-described out of service recovery algorithm(s) can increase (or decrease) scanning rates (or the overall scan ratio) as the mobility attribute indicates that the mobile computing device increases (or decreases) mobility. Battery life may therefore be improved.

Regarding battery-related data, the herein-described out of service recovery algorithm(s) can obtain sensor information, such as battery life data from a battery sensor, to determine a battery attribute of the scanning context. The herein-described out of service recovery algorithm(s) can increase (or decrease) scanning rates (or the overall scan ratio) as the battery attribute indicates that the mobile computing device has more (or less) battery power available. If the battery attribute indicates that battery power is critically low (e.g., less than a pre-determined amount of battery life, such as 5%, 10%, or 20%), the herein-described out of service recovery algorithm(s) can be tuned to try to save as much battery power as possible by reducing scanning rates (or the overall scan ratio). Battery performance may therefore be improved.

Regarding screen status data, the herein-described out of service recovery algorithm(s) are based on an insight that a user of the mobile computing device can have a perception that being in service is more important when the user is looking at information provided by the mobile computing device: that is, when a screen (such as a touch screen) associated with the mobile computing device is active. A screen associated with the mobile computing device can be a visual entity that is physically attached to the mobile computing device and/or that is communicatively coupled to the mobile computing device (e.g., via wired and/or wireless connections) which may provide information from the mobile computing device at least visually to a user or other entity. Examples screens that can be associated with the mobile computing device include, but are not limited to, one or more: touch screens, internal displays, external displays, displays associated with a vehicle such as a dashboard display, smartwatch displays, head-mounted displays televisions, and/or virtual reality devices. Thus, information about screen status can be used to decide when to initiate scanning and/or in determining scanning rates (or the overall scan ratio). For example, a scan of frequencies in the set of frequencies to acquire service can be triggered when screen-related data indicates that the screen has been turned on and/or a set of scanning rates associated with the set of frequencies can be increased when screen-related data indicates that the screen has been turned on. In further examples, user presence data from presence-sensitive sensors may be used as an attribute instead of or in addition to screen status data. For instance, always-on screen devices may have varying levels of screen "on". A presence-sensitive sensor may be used to detect user presence information such as hand gestures to evaluate user activity. A measure of user activity may then be used as a basis for adjust scanning rates.

The herein-described out of service recovery algorithm(s) can obtain sensor information, such as screen activation status data from a sensor associated with the screen (or in some cases, directly from the screen), to determine a screen activity attribute of the scanning context. Then, the herein-described out of service recovery algorithm(s) can increase (or decrease) scanning rates (or the overall scan ratio) as the screen activity attribute indicates that the screen of the mobile computing device is active (or inactive). Also, as mentioned above, a transition of the screen activity attribute from a state associated with an inactive screen to another state associated with an active screen, can trigger a scan of frequencies to acquire service.

Regarding thermal status data, the herein-described out of service recovery algorithm(s) can obtain the thermal status data from one or more sensors. For example, device temperature information and/or environmental temperature information about an environment related to the mobile computing device can be obtained from one or more thermometers and/or other thermal sensors. The herein-described out of service recovery algorithm(s) can determine a thermal attribute based on the thermal status data. The herein-described out of service recovery algorithm(s) can decrease (or increase) scanning rates (or the overall scan ratio) as the battery attribute indicates that the mobile computing device and/or the environment related to the mobile computing device is warmer (or colder). Other sensor-related data and/or attributes are possible as well, for example, as discussed herein.

In some examples, the attributes of the scanning context can be determined once the mobile computing device determines that it is out of service. In other examples, some or all of the attributes of the scanning context can be determined before the mobile computing device goes out of service.

If the mobile computing device goes out of service, the herein-described out of service recovery algorithm(s) can utilize the attributes of the scanning context to determine a scanning profile. The scanning profile can include a set of frequencies and a related set of scanning rates for scanning the set of frequencies to acquire service for the mobile computing device. More particularly, the herein-described out of service recovery algorithm(s) can look at sensor data, as indicated in the attributes of the scanning context, to intelligently adjust the set of frequencies and the related set of scanning rates of the scanning profile, e.g., so as to strike a balance between service acquisition time and power consumption.

The use of the herein-described out of service recovery algorithm(s) to determine scan ratios for acquiring service can reduce the power needed to acquire (or reacquire) service for the mobile computing device over conventional techniques. By reducing power consumption, battery life of the mobile computing device can be extended and thereby increase the availability of the mobile computing device for a user. Further, by extending battery life, the herein-described out of service recovery algorithm(s) can make more attempts to acquire service before the battery of the mobile computing device is exhausted, thereby enabling the mobile computing device to increase the probability over time of acquiring service. Thus, the herein-described out of service recovery algorithm(s) can beneficially extend battery life and can beneficially increase the probability of service acquisition for an out-of-service mobile computing device.

FIG. 1 is a diagram 100 showing connections between mobile computing devices and access points for wireless networks, in accordance with example embodiments. At upper left of FIG. 1, mobile computing device 130 is shown not being connected to any other devices. As such, mobile computing device 130 is shown as being out of service.

At upper center of FIG. 1, mobile computing device 132 is shown as having data-only connection 142 with access point 120. In some examples, access point 120 could be part of a wireless local area network (WLAN). In such examples, mobile computing device 132 may utilize Wi-Fi and/or one or more similar protocols to establish a WLAN connection with WLAN access point 120 for data services. With such a connection, mobile computing device 132 is in service with respect to data services, but is out of service with respect to voice services.

At upper right of FIG. 1, mobile computing device 134 is shown as having voice and data connection (VDC) 144 with access point 122. In some examples, access point 122 could be part of a WLAN. In such examples, mobile computing device 134 may utilize Wi-Fi or a similar protocol to establish a WLAN connection with WLAN access point 122 for data and voice services (e.g., voice over Wi-Fi services). With such a connection, mobile computing device 134 is in service with respect to both data and voice services.

At lower left of FIG. 1, mobile computing device 136 is shown as having voice and data connection 146 with access point 110. In some examples, access point 110 could be part of a wireless wide area network (WWAN). In such examples, mobile computing device 136 may utilize a 2G ($2^{nd}$ Generation Wireless Systems), 3G ($3^{rd}$ Generation Wireless Systems), 4G ($4^{th}$ Generation Wireless Systems), 5G ($5^{th}$ Generation Wireless Systems), Global System for Mobile communication (GSM), Time Division Multiple Access (TDMA), Code Division Multiplexed Access (CDMA), and/or one or more similar protocols to establish a connection with WWAN access point 110 for data and voice services. With such a connection, mobile computing device 136 is in service with respect to both data and voice services. In other examples, mobile computing device 136 could have a voice-only connection with WWAN access point 110. With such a connection, mobile computing device 136 is in service with respect to voice services but is out of service with respect to data services.

At lower right of FIG. 1, mobile computing device 138 has two connections—voice and data connection 148a with WWAN access point 112 and voice and data connection 148b with WLAN access point 124. With these connections 148a and 148b, mobile computing device 138 is in service with respect to both data and voice via both a WWAN and a WLAN. In other examples, mobile computing device 138 can be in service with respect to one network but out of service with respect to another network. For example, WLAN access point 124 could provide data-only services to mobile computing device 138 such that mobile computing device 138 is out of service for voice services with the WLAN, and WWAN access point 112 could provide voice-only services to mobile computing device 138 such that mobile computing device 138 is out of service for data services with the WWAN. In related examples, a mobile computing device can be connected to multiple WLAN access points and/or multiple WWAN access points simultaneously.

In other examples, other services (e.g., video services, streaming data services, text services, and/or other content services) can be provided to a mobile computing device connected to one or more networks via one or more access points. In these other examples, the mobile computing device can be considered to be in service or out of service with respect to each of these other services, along with and/or instead of, data and voice services. For example, a mobile computing device could be in service with respect to a basic (e.g., narrow-band) data service, such as text messaging, but could be out of service with respect to a broadband data service, such as streaming data and/or video services. For purposes of illustration, only voice and data services are discussed in detail herein. However, one of skill in the art can readily apply the herein-described out of service algorithm(s) to services other than voice and data services.

Figure 2:
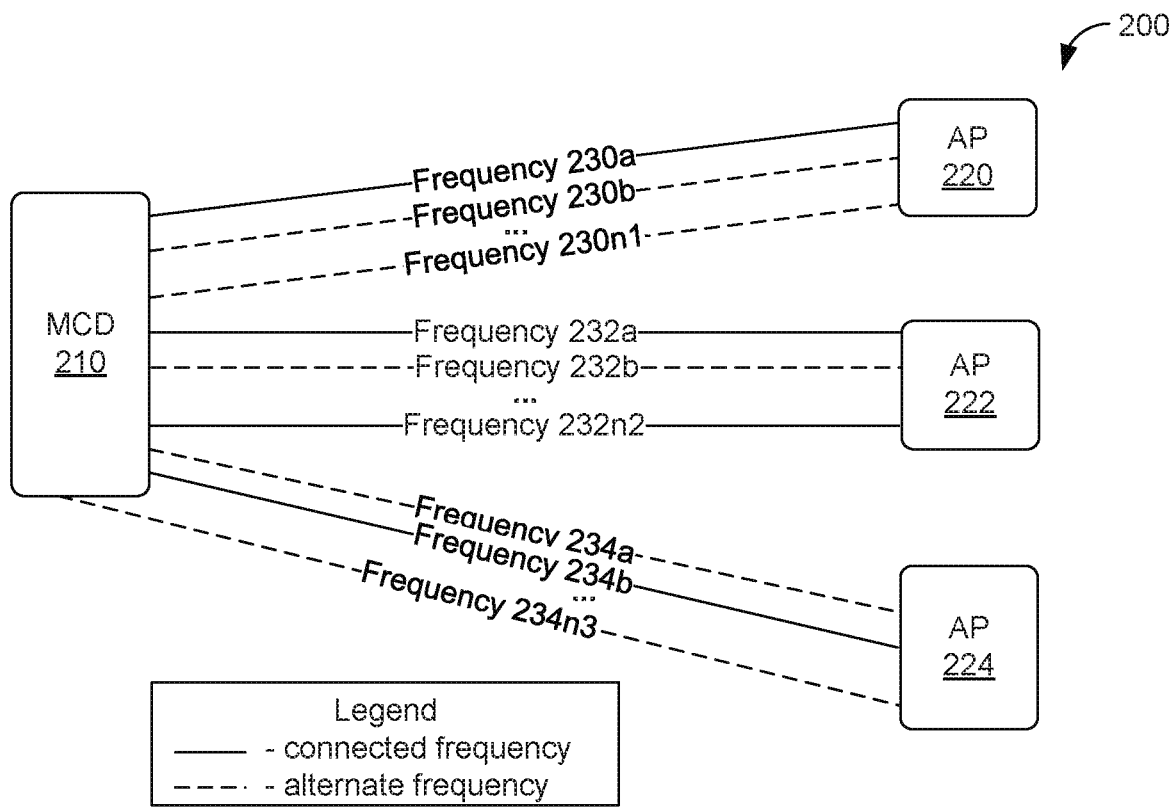
FIG. 2 illustrates connections between a mobile computing device and three access points, and a related scanning profile for the mobile computing device, in accordance with example embodiments.

FIG. 2 shows diagram 200, which illustrates connections between mobile computing device 210 and access points 220, 222, 224 and scanning profile 250 for the mobile computing device, in accordance with example embodiments. An upper portion of FIG. 2 illustrates connections between mobile computing device 210 and access points 220, 222, 224, where access points 220, 222, 224 can be used to connect mobile computing device 210 with one or more WLANs and/or one or more WWANs by way of one or more of the frequencies 230a, 230b, 230n1, 232a, 232b, 232n2, 234a, 234b, 234n3 and perhaps other frequencies.

Diagram 200 illustrates two different types of frequencies that can be used to connect mobile computing device 210 with an access point: a connected frequency used to connect to the access point, and an alternate frequency, which could be used to connect to the access point, but is not currently being used in a connection. As indicated by the legend of diagram 2. FIG. 2 illustrates connections between mobile computing device 210 and an access point using a connected frequency with solid lines and illustrates possible connections that could be made between mobile computing device 210 and an access point using an alternate frequency with dashed lines. Other types of connections and frequencies are possible as well.

Diagram 200 shows that mobile computing device 210 is connected to access point 220 using connected frequency 230a and that frequencies 230b . . . 230n1 are alternate frequencies that could be used to connect mobile computing device 210 to access point 220. In the example shown in diagram 200, there are n1 total possible frequencies that can possibly be used to connect mobile computing device 210 and access point 220—one actual frequency 230a used for a connection between mobile computing device 210 and access point 220 and (n1−1) alternate frequencies for possible connections between mobile computing device 210 and access point 220.

Diagram 200 also shows that mobile computing device 210 is connected to access point 222 using connected frequencies 232a and 232n2 and that at least frequency 232b is an alternate frequency that could be used to connect mobile computing device 210 to access point 222. In the example shown in diagram 200, there are n2 total possible frequencies that can possibly be used to connect mobile computing device 210 and access point 222—two actual frequencies 232a and 232n2 used for one or more connections between mobile computing device 210 and access point 222 and (n2−2) alternate frequencies for possible connections between mobile computing device 210 and access point 222.

Diagram 200 further shows that mobile computing device 210 is connected to access point 224 using connected frequency 234b and that at least frequencies 234a and 234n3 are alternate frequencies that could be used to connect mobile computing device 210 to access point 224. In the example shown in diagram 200, there are n3 total possible frequencies that can possibly be used to connect mobile computing device 210 and access point 224—one actual frequency 234b used for a connection between mobile computing device 210 and access point 224 and (n3−1) alternate frequencies for possible connections between mobile computing device 210 and access point 224. In other examples, mobile computing device 210 can connect to more, fewer, and/or different access points than shown in diagram 200 and/or can use more, fewer, and/or different frequencies to connect to access points than shown in diagram 200.

A lower portion of FIG. 2 shows scanning profile 250 for mobile computing device 210 for connecting with at least access points 220, 222, 224. Scanning profile 250 shows a set of frequencies 260 and a corresponding set of scanning rates 262. In other examples, more, fewer, and/or different data can be provided in scanning profile 250; e.g., different sets of frequencies and/or scanning rates, additional access points and/or other information.

A frequency in set of frequencies 260 could be used to connect mobile computing device 210 to an access point. The herein-described out of service recovery algorithm(s) can attempt to connect to the frequency in set of frequencies 260 at a corresponding scanning rate in set of scanning rates 262. For example, scanning profile 250 shows that "Freq 230a" (which is short for frequency 230a) can be used to connect mobile computing device 210 with access point 220 by scanning frequency 230a at a scanning rate of "Rate 1". Scanning profile 250 also shows that "Freq 230b" . . . "Freq 230n1"; that is, frequencies 230b . . . 230n1 can be used to connect mobile computing device 210 with access point 220 by scanning respective frequencies 230b . . . 230n1 at respective scanning rates of "Rate 2" . . . "Rate n1".

Scanning profile 250 also shows that "Freq 232a", "Freq 232b" . . . "Freq 232n2"; that is, frequencies 232a, 232b . . . 232n2 can be used to connect mobile computing device 210 with access point 222 by scanning respective frequencies 232a, 232b . . . 232n2 at respective scanning rates of "Rate n1+1", "Rate n1+2" . . . "Rate n1+n2". Additionally, scanning profile 250 shows that "Freq 234a", "Freq 234b" . . . "Freq 234n3"; that is, frequencies 234a, 234b . . . 234n3, can be used to connect mobile computing device 210 with access point 224 by scanning respective frequencies 234a, 234b . . . 234n3 at respective scanning rates of "Rate n1+n2+1", "Rate n1+n2+2" . . . "Rate n1+n2+n3".

The herein-described out of service recovery algorithm(s) can use the data in scanning profile 250 to attempt to connect mobile computing device 210 to a network and/or put mobile computing device 210 into service. For example, the herein-described out of service recovery algorithm(s) can start with data from the first row of scanning profile 250 and scan frequency 230a at a scanning rate of Rate 1. More particularly, if Rate 1 were twenty connection attempts per minute, then the herein-described out of service recovery algorithm(s) can attempt to connect mobile computing device 210 to access point 220 using frequency 230a twenty times per minute until either (a) mobile computing device 210 connects with access point 220 or (b) the herein-described out of service recovery algorithm(s) determines to stop scanning access point 220 using frequency 230a. If one of these scans is successful and mobile computing device 210 connects to access point 220 using frequency 230a to put mobile computing device 210 in service (at least with respect to service provided by access point 220), then the herein-described out of service recovery algorithm(s) can stop scanning on at least frequency 230a.

However, if the attempts to connect frequency 230a at Rate 1 were unsuccessful, then the herein-described out of service recovery algorithm(s) can stop scanning access point 220 using frequency 230a and select the next frequency in scanning profile 250 to attempt to return mobile computing device 210 to service.

For example, suppose that the herein-described out of service recovery algorithm(s) perform a predetermined number of scans and/or scans for a predetermined amount of time before determining to stop scanning an access point (or more generally, a network) using a particular frequency. Then, after the predetermined number of scans and/or predetermined amount of time elapses without connecting mobile computing device 210 to the access point, the herein-described out of service recovery algorithm(s) can stop scanning the access point using the particular frequency and select another frequency and another related scanning rate from scanning profile 250 to continue scanning access points.

As a more particular example, the herein-described out of service recovery algorithm(s) can determine to stop scanning access point 220 using frequency 230a and subsequently select a next frequency from scanning profile 250. In this example, the next frequency of set of frequencies 260 in scanning profile 250 is frequency 230b, and the herein-described out of service recovery algorithm(s) can attempt to scan frequency 230b at a corresponding scanning rate shown in set of scanning rates 262 of FIG. 2 as "Rate2". The herein-described out of service recovery algorithm(s) can continue scanning frequencies at corresponding scanning rates as set forth in scanning profile 250 until either (a)

mobile computing device 210 connects to a network and/or is in service via a scanned frequency or (b) the herein-described out of service recovery algorithm(s) has scanned all of the frequencies of set of frequencies 260 in scanning profile 250 without successfully connecting mobile computing device 210 to a network and/or putting mobile computing device 210 into service.

The herein-described out of service recovery algorithm(s) can determine a scanning profile, such as scanning profile 250, based on a scanning context associated with a mobile computing device. The scanning context can have one or more attributes that can be utilized to determine the scanning profile, a set of frequencies, and/or a related set of scanning rates.

FIG. 3 depicts scanning context 300 for connecting a mobile computing device with one or more networks, in accordance with example embodiments. Scanning context 300 includes one or more attributes 310 that can take respective attribute values 312, where each attribute of attributes 310 can have a respective effect 314 on a scanning profile determined using scanning context 300. Attributes 310 can include a mobility attribute, a battery attribute, a screen activity attribute, a thermal attribute, a software application (or "app" for short) attribute, a most recently used (MRU) frequency attribute, a predicted location attribute, and an actual location attribute. In other examples, scanning context 300 can include more, fewer, and/or different attributes than attributes 310.

Some or all values of attributes 310 can be based on data associated with the mobile computing device, including sensor data. As examples:

- a value of the mobility attribute can be based on sensor data from a location sensor, a Global Positioning System (GPS) sensor, a motion sensor and/or an accelerometer;
- a value of the battery attribute can be based on sensor data from a battery sensor,
- a value of the screen activity attribute can be based on data indicating whether a screen associated with the mobile computing device is active;
- a value of the thermal attribute can be based on sensor data from a thermometer and/or another thermal sensor;
- a value of the software application attribute can be determined from operating system data about executing and/or ready to execute software applications of the mobile computing device;
- a value of the most recently used (MRU) frequency attribute can be determined by storing data about one or more frequencies used to connect the mobile computing device to a network and/or location data from a location sensor, a GPS sensor, a motion sensor and/or an accelerometer indicating one or more locations where the one or more frequencies were used to connect the mobile computing device to a network (e.g., a WWAN, a WLAN);
- a value of the predicted location attribute can be determined by a statistical analysis of location data of the mobile computing device over time, and a prediction of a location of the mobile computing device at a particular time based on the statistical analysis; and
- a value of the actual location attribute can be determined based on location data from a location sensor, a GPS sensor, a motion sensor and/or an accelerometer indicating one or more locations of the mobile computing device.

Other attributes can be determined based on other data associated with the mobile computing device, including, but not limited to, other sensor data obtained from the mobile computing device and/or from one or more other sources.

FIG. 3 shows that the mobility attribute of attributes 310 can have a value 312 selected from at least "[s]tatic, walking, driving" and can have an effect 314 on a scanning profile of "[i]ncreas[ing] scanning rate as mobility increases". A mobility attribute value of static can indicate that a mobile computing device is staying in one place or nearly staying in one place, such as not moving outside of a predetermined region (e.g., a region where part or all of a building such as a home or office is located, a fixed size circle, square, rectangle or other shape surrounding a location of the mobile computing device, where the shape represents the predetermined region). A mobility attribute value of walking can indicate that the mobile computing device is moving at a relatively slow rate, such as moving at a rate commonly associated with a walking person. Such rate of movement could be, for example, approximately 1 to 5 miles per hour or approximately 1 to 8 kilometers per hour. A mobility attribute value of driving can indicate that the mobile computing device is moving at a relatively fast rate, such as moving a rate commonly associated with a driving vehicle. Such rate of movement could be, for example, approximately 5-200 miles per hour, approximately 8 to 320 kilometers per hour, or a rate of movement that exceeds 10 miles per hour (or 18 kilometers per hour). In other examples, the mobility attribute can be represented using one or different values than the above-mentioned static/walking/driving value, such as a numerical speed value, a velocity vector value, combinations of speed, velocity, and/or acceleration values, or a qualitative value that has different categories than static/walking/driving.

Once the mobility attribute has been determined, the herein-described out of service recovery algorithm(s) can use the mobility attribute at least for determining scanning rates of a scanning profile; e.g., one or more from set of scanning rates 262 of scanning profile 250. In particular, the herein-described out of service recovery algorithm(s) can increase one or more scanning rates as the mobility attribute indicates that the mobile computing device is moving faster. As such, the one or more scanning rates can be positively correlated with the rate of movement of the mobile computing device as indicated by the mobility attribute. For example, a scanning rate can be relatively high when the mobility attribute indicates that a rate of movement of the mobile computing device is relatively high, such as when driving, and the scanning rate can be relatively low when the mobility attribute indicates that a rate of movement of the mobile computing device is relatively low, such as when static.

The herein-described out of service recovery algorithm(s) can increase scanning rates as the mobile computing device increases speed (and thereby moves faster) based on an observation that a probability that the frequencies and strengths of signals received by the mobile computing device will change can increase as the mobile computing device increases speed. For example, suppose that the mobility attribute has three categories as discussed above: static, walking, and driving. In this example, the herein-described out of service recovery algorithm(s) may determine respective scanning rates for a particular frequency F1 of the set of frequencies of the scanning profile as: X, X+d1, and X+d2. For this example, X is a baseline scanning rate for F1 associated with a mobile computing device, where the baseline scanning rate is associated with a static mobility attribute value, and where X>0.

Continuing this example, the value X+d1 is a scanning rate for F1 associated with a mobile computing device whose mobility attribute value is walking, where X is as previously described for this example, and where d1>0. As such, X+d1 is greater than X. Further continuing this example, the value X+d2 is a scanning rate for F1 associated with a mobile computing device, whose mobility attribute value is driving, where X is as previously described for this example, and where d2>d1. As such, X+d2 is greater than X. Then, the baseline scanning rate of X, which is the scanning rate associated with the static mobility attribute value, is less than the scanning rate of X+d1, which is the scanning rate associated with the walking mobility attribute value, and X+d1 is less than X+d2, which is the scanning rate associated with the driving mobility attribute value. Other techniques for determining scanning rates based on the mobility attribute are possible as well.

FIG. 3 shows that the battery attribute of attributes 310 can have a value 312 representing "Battery life %" and can have an effect 314 on a scanning profile of "[i]ncreas[ing] scanning rate as battery life increases". The battery life percentage value of the battery attribute can increase as a battery of the mobile computing device has more power. In some examples, the battery attribute can use different values than battery life percentage, such as but not limited to, battery power values, qualitative battery values (e.g., high battery power, low battery power), battery usage values, and/or values related to time since last battery charge.

Once the battery attribute has been determined, the herein-described out of service recovery algorithm(s) can use the battery attribute at least for determining scanning rates of a scanning profile; e.g., one or more of set of scanning rates 262 of scanning profile 250. In particular, the herein-described out of service recovery algorithm(s) can increase one or more scanning rates as the battery attribute indicates that the mobile computing device has increasingly longer battery life. The herein-described out of service recovery algorithm(s) can increase scanning rates as the mobile computing device has longer battery life based on an observation that the mobile computing device can scan more frequently and/or for longer periods of time when the mobile computing device has longer battery life and/or more battery power. As such, one or more scanning rates can be positively correlated with battery power of the mobile computing device as indicated by the battery attribute. For example, a scanning rate can be relatively high when the battery attribute indicates that battery power of the mobile computing device is relatively high, such as when the battery life percentage value is above 50% or between 90-100%, and the scanning rate can be relatively low when the battery attribute indicates that battery power of the mobile computing device is relatively low, such as when the battery life percentage value is below 50% or between 0-10%.

For example, suppose that a value of the battery attribute ranges from 0 to 100, indicating a percentage of battery life of one or more batteries of the mobile computing device. In that case, the herein-described out of service recovery algorithm(s) can determine respective scanning rates for a particular frequency F1 of the set of frequencies of the scanning profile as $X*[(BA-c1)/c2]$, where X is a baseline scanning rate for F1 associated with a mobile computing device, X>0, where BA is a value of the battery attribute, and where c1 and c2 are predetermined values with 100>c1, c2≥0, and where c1+c2<100. The c1 and c2 values can be pre-determined constant values, where c1 represents a minimum battery life to perform a scan and c2 represents a scaling value to convert battery life to a scan multiplier used to multiply a baseline scanning rate of X. If the scan multiplier; that is the value of $[(BA-c1)/c2]$ is negative or zero, then the scanning rate can be determined to be zero and no scanning can be performed. Note that the scan multiplier will be zero or negative if BA≤c1, will be between zero and one if c1<BA≤(c1+c2), will be between one and two if (c1+c2)<BA≤(c1+2*c2), and so on. Since BA is in the range of 0 to 100, the maximum scan multiplier value is (100−c1)/c2. Other techniques for determining a scanning rate based on a battery attribute value are possible as well.

FIG. 3 shows that the screen activity attribute of attributes 310 can have a value 312 selected from at least "[a]ctive, inactive" and can have an effect 314 on a scanning profile of "[i]f screen is active, increas[ing] scanning rate". In some examples, the screen activity attribute can use different values than a qualitative value of either "active" or "inactive." For instance, the screen activity attribute value can be based on a screen brightness level (perhaps where a brightness level of zero or another predetermined value indicates a screen associated with the mobile computing device is not active) and/or a screen activity timer indicating how long the screen associated with the mobile computing device has (or has not) been active.

Once the screen activity attribute has been determined for one or more screens associated with the mobile computing device, the herein-described out of service recovery algorithm(s) can use the screen activity attribute at least for determining scanning rates of a scanning profile; e.g., one or more of the set of scanning rates 262 of scanning profile 250. In particular, the herein-described out of service recovery algorithm(s) can increase one or more scanning rates as the screen activity attribute indicates that at least one screen associated with the mobile computing device is active. The herein-described out of service recovery algorithm(s) can increase scanning rates as the screen activity attribute increases based on an observation that the mobile computing device is actively being utilized when at least one screen associated with the mobile computing device is active. Beneficially, when the user is actively utilizing the mobile computing device, the user may have more concern if the mobile computing device is out of service, and so the scanning rate can responsively increase.

For example, suppose that a value of the screen activity attribute is either 0 or 1, where 0 corresponds to an inactive value of the screen activity attribute is indicating a screen associated with the mobile computing device is not active, and where 1 corresponds to an active value indicating the screen associated with the mobile computing device is active. In examples where multiple screens are associated with the mobile computing device, SA can be set to 1 if at least one screen of the multiple screens is active, and SA can be set to 0 if no screen of the multiple screens is active.

Then, the herein-described out of service recovery algorithm(s) can determine respective scanning rates for a particular frequency F1 of the set of frequencies of the scanning profile as $X*(1+c3*SA)$, where X is a baseline scanning rate for frequency F1. X>0, where SA is a value of the battery attribute (SA equaling either 0 or 1 as discussed above) and where c3 is a predetermined value, c3≥0. In this example, if SA=0, such as when the screen of the mobile computing device is inactive, then $(1+c3*SA)=(1+0)=1$, and so the respective scanning rate X for frequency F1 when SA=0 would be X. Continuing this example, if SA=1, such as when the screen of the mobile computing device is active, then $(1+c3*SA)=1+c3$, and so the respective scanning rate X for frequency F1 when SA=1 would be $X*(1+c3)$. Since c3>0, the respective scanning rate X for frequency F1 when SA=1 would be greater than when SA=0. As such, a particular scanning rate of the set of scanning rates can be relatively high when the screen attribute indicates that screen associated with the mobile computing device is active, such as when SA=1 in the example above. As well, the particular scanning rate can be relatively low when the screen attribute indicates that the screen associated with the mobile computing device is not active, such as when SA=0 in the example above. Other techniques for determining a scanning rate based on a screen activity attribute are possible as well.

FIG. 3 shows that the thermal attribute of attributes 310 can have a value 312 representing "[d]evice temperature in ° C. (or ° F.)"; that is, a temperature of the mobile computing device, and can have an effect 314 on a scanning profile of "[d]ecreas[ing] scanning rate as thermal attribute increases". The value of the thermal attribute can increase as a temperature of part or all of the mobile computing device and/or a temperature of an environment around the mobile computing device increases. In some examples, the thermal attribute can use different values than temperature values of part or all of the mobile computing device, such as but not limited to, temperature values of an environment around the mobile computing device, and/or a qualitative temperature measurement (e.g., relatively hot, relatively cold, average temperature).

Once the thermal attribute has been determined, the herein-described out of service recovery algorithm(s) can use the thermal attribute at least for determining scanning rates of a scanning profile; e.g., one or more of set of scanning rates 262 of scanning profile 250. In particular, the herein-described out of service recovery algorithm(s) can decrease one or more scanning rates as the thermal attribute indicates that the mobile computing device has a higher temperature. The herein-described out of service recovery algorithm(s) can decrease scanning rates as the mobile computing device has a higher temperature based on an observation that the mobile computing device will use power and thereby increase device temperature, if the mobile computing device scans more frequently and/or for longer periods of time. As such, one or more scanning rates can be negatively correlated with temperature of the mobile computing device as indicated by the thermal attribute. For example, a scanning rate can be relatively high when the thermal attribute indicates that temperature of the mobile computing device is relatively low and the scanning rate can be relatively low when the thermal attribute indicates that temperature of the mobile computing device is relatively high.

For example, suppose that a value of the thermal attribute ranges from a lowest possible temperature of T1 to a highest possible temperature of T2, indicating a temperature of the mobile computing device. In that case, the herein-described out of service recovery algorithm(s) can determine respective scanning rates for a particular frequency F1 of the set of frequencies of the scanning profile as $X*\{1+[c4*(T2-TA)]\}$, where X is a baseline scanning rate for frequency F1, X>0, where TA is a value of the thermal attribute with $T1 \leq TA \leq T2$, and where c4 is a predetermined value, c4>0. Then, as TA increases, (T2−TA) will decrease and eventually reach 0 when TA=T2. Because c4>0, the value 1+[c4*(T2−TA)] will be greater than 1 when TA≤T2, and the value will be equal to 1 when TA=T2. As a result, the scanning rate will increase as the value of the thermal attribute decreases. Other techniques for determining a scanning rate based on a thermal attribute value are possible as well.

FIG. 3 shows that the software application attribute of attributes 310 can have a value 312 representing a "[n]umber of active applications" and can have an effect 314 on a scanning profile of "increas[ing] scanning rate" when "one or more applications [are] active". The value of the software application attribute can increase as the mobile computing device executes more software applications. In some examples, the software application attribute can use different values than a number of active software applications, such as but not limited to, an average number of software applications that have been active during a period of time, a number of software applications that have been launched during a period of time, and/or a number of software applications that have received user input during a period of time.

Once the software application attribute has been determined, the herein-described out of service recovery algorithm(s) can use the software application attribute at least for determining scanning rates of a scanning profile; e.g., one or more from set of scanning rates 262 of scanning profile 250. In particular, the herein-described out of service recovery algorithm(s) can increase one or more scanning rates as the software application attribute increases.

The herein-described out of service recovery algorithm(s) can increase scanning, or scan, rates as the software application attribute increases based on an observation that the mobile computing device is being actively utilized by a user if at least one software application is active. Because the user is actively utilizing the mobile computing device, the user may be paying more attention to the mobile computing device being out of service, and so the scanning rate can responsively increase. For example, suppose that a value of the software application attribute is an integer value specifying a number of active applications that ranges from 0 to APPMAX, where a value of 0 indicates that no software applications are active and where APPMAX is a value that indicates a maximum number of active applications. In that case, the herein-described out of service recovery algorithm(s) can determine respective scanning rates for a particular frequency F1 of the set of frequencies of the scanning profile as $X*[SAA*c5+c6]$, where X is a baseline scanning rate for frequency F1, X>0, where SAA is a value of the software application attribute, and where each of c5 and c6 is a predetermined value, c5>0, c6≥0. By multiplying SAA by a positive value c5, the scanning rate will increase as the number of active applications (as represented by SAA) increases. The addition of c6 allows for a positive scanning rate even if SAA equals 0.

As such, one or more scanning rates can be positively correlated with a number of active software applications of the mobile computing device as indicated by the software application attribute. For example, a scanning rate can be relatively high when the software application attribute indicates that a number of active software applications of the mobile computing device is relatively high, such as greater than 1 or greater than 80% of APPMAX, and the scanning rate can be relatively low when the software application attribute indicates that a number of active software applications of the mobile computing device is relatively low, such as less than or equal to 1 or less than 20% of APPMAX.

In another example, the herein-described out of service recovery algorithm(s) can determine respective scanning rates for a particular frequency F1 of the set of frequencies of the scanning profile as $X*[(SAA>0)?c7:c8]$, where X is a baseline scanning rate for frequency F1, X>0, where SAA is a value of the software application attribute, and where each of c7 and c8 is a predetermined value, c7>0, c8≥0. In this example, the operation (SAA>0)?c7:c8 involves first determining a binary value of a conditional "(SAA>0)", and then the operation returns the value of c7 if the binary value of the conditional is true or the operation returns the value of c8 if the binary value of the conditional is false. Such an operation would return c7 if the software application attribute indicates at least one application were active on the mobile computing device, or would otherwise return c8. Other techniques for determining a scanning rate based on a software application attribute value are possible as well.

FIG. 3 shows that the most recently used frequency attribute of attributes 310 can have a value 312 representing "MRU frequency value(s)" and can have an effect 314 on a scanning profile of "[s]elect[ing] most recently used (MRU) frequency first and/or [c]hang[ing] MRU frequency's scan rate". The value of the most recently used frequency attribute can be a frequency value for a most-recently-used or, more generally, previous frequency used to provide a particular service and/or to connect to a particular network, access point, and/or one or more other network entities. In some examples, the most recently used frequency attribute can list one frequency used to provide the particular service and/or to connect to the particular network, access point and/or one or more other network entities. In other examples, the most recently used frequency attribute can list multiple frequencies previously used to provide the particular service and/or to connect to the particular network, access point and/or one or more other network entities. For instance, the most recently used frequency attribute can list the most recently used NUM_FREQ frequencies, where NUM_FREQ can be an integer greater than 1.

Once the most recently used frequency attribute has been determined, the herein-described out of service recovery algorithm(s) can use the most recently used frequency attribute at least for determining a set of frequencies to scan for service and/or for determining one or more related scan rates. The herein-described out of service recovery algorithm(s) can attempt to use most recently used and/or previously used frequencies first based on an observation that a most recently used frequency has worked in the past to connect to an access point, network, and/or other network entity. Thus, a frequency that worked in the past can be tried first during a later attempt to connect to that access point, network, and/or other network entity.

For example, suppose that the most recently used frequency attribute lists NUM_FREQ1 most recently used frequencies to connect to an access point AP1 of network NET1, where NUM_FREQ1>0. In that case, the herein-described out of service recovery algorithm(s) can add the NUM_FREQ1 most recently used frequencies to a set of frequencies used to scan for possible connections to access point AP1 and/or network NET1. More specifically, suppose that NUM_FREQ1=3 and that there are ten possible frequencies that the mobile computing device can scan for possible connections to access point AP1. The herein-described out of service recovery algorithm(s) can generate a set of ten possible frequencies for possible connections to access point AP1, where the first NUM_FREQ1=3 frequencies in the set of ten could be the three frequencies of the most recently used frequency attribute and the remaining seven possible frequencies can be listed after the three frequencies of the most recently used frequency attribute; i.e., the three frequencies of the most recently used frequency attribute can precede the remaining seven possible frequencies in the set of ten possible frequencies. If the herein-described out of service recovery algorithm(s) use this set of ten frequencies to scan access point AP1, the first three frequencies scanned will be the three frequencies of the most recently used frequency attribute, and the last seven frequencies scanned will be the remaining possible frequencies.

Also, a scan rate for a most recently used and/or previously used frequency can be changed from, and thereby differ from, a scan rate for a non-most-recently-used and/or non-previously-used frequency. For example, the scan rate for a most recently used and/or previously used frequency can be associated with a value of SR_MRU and a scan rate for a corresponding non-most-recently-used and/or non-previously-used frequency can be associated with a value SR_NONMRU, where SR_MRU≠SR_NONMRU. Then, X, discussed above as the value of the baseline scanning rate for frequency F1, can be initialized to the SR_MRU value if F1 is a most recently used and/or previously used frequency, and X can be initialized to the SR_NONMRU value if F1 is a most recently used and/or previously used frequency. In some examples, SR_MRU>SR_NONMRU to indicate a higher scan rate for most recently used and/or previously used frequencies than the scan rate for non-most-recently-used and/or non-previously-used frequencies. Other techniques for setting a scan rate for a most recently used and/or previously used frequency to be different from a scan rate for a non-most-recently-used and/or non-previously-used frequency are possible as well. And other techniques for determining and/or utilizing a most recently used frequency attribute are possible as well.

FIG. 3 shows that the predicted location attribute of attributes 310 can have a value 312 representing "[l]at/long, of predicted location(s)", which is short for latitude and longitude values of one or more predicted locations of the mobile computing device and/or a user of the mobile computing device, and can have an effect 314 on a scanning profile of "[s]elect[ing] frequencies based on actual MCD location". A predicted location can be a location that the mobile computing device and/or a user of the mobile computing device is expected to visit. In some examples, the predicted location attribute can include one predicted location. In other examples, the predicted location attribute can include more than one predicted location.

A predicted location can be determined using a statistical analysis of location data of the mobile computing device over time, and a prediction of a location of the mobile computing device at a particular time can be based on the statistical analysis. As indicated above, a predicted location can be specified using latitude and longitude values. In other examples, a predicted location could be specified using coordinates specified by a particular map, using a mailing address, using a postal code, and/or specified in some other manner.

Once the predicted location attribute has been determined, the herein-described out of service recovery algorithm(s) can use the predicted location attribute at least for determining a set of frequencies to scan for service. The herein-described out of service recovery algorithm(s) can use the predicted location(s) specified in the predicted location attribute to determine one or more access points, networks, and/or other network entities that can provide service at the predicted location(s), and include the frequencies (and related scanning rates) for the access points, networks, and/or other network entities that can provide service at the predicted location(s).

For example, suppose that the predicted location attribute indicates that the mobile computing device is predicted to be a location L1 where two access points APL1A and APL1B can provide service to the mobile computing device. In this example, the herein-described out of service recovery algorithm(s) can determine that the mobile computing device is likely to be at location L1 using the predicted location attribute, determine that access points APL1A and APL1B provide service at location L1, and add subsets of frequencies F_APL1A and F_APL1B to a set of frequencies of a profile, where respective subsets of frequencies F_APL1A and F_APL1B can be used to connect to respective access points APL1A and APL1B at location L1 to provide service to the mobile computing device. Other techniques for determining and/or utilizing a predicted location attribute are possible as well.

FIG. 3 shows that the actual location attribute of attributes 310 can have a value 312 representing "lat./long. of actual location", which is short for latitude and longitude values of one or more actual locations of the mobile computing device and/or a user of the mobile computing device, and can have an effect 314 on a scanning profile of "[s]elect[ing] frequencies based on predicted MCD location". An actual location can be a location that the mobile computing device and/or a user of the mobile computing device has (recently) visited. In some examples, the actual location attribute can list one actual location. In other examples, the actual location attribute can list more than one actual location.

An actual location can be determined by using one or more sensors, such as a location sensor and/or GPS device, to provide location data indicating the actual location of the mobile computing device and/or a user of the mobile computing device. As indicated above, an actual location can be specified using latitude and longitude values. In other examples, an actual location could be specified using coordinates specified by a particular map, using a mailing address, using a postal code, and/or specified in some other manner.

Once the actual location attribute has been determined, the herein-described out of service recovery algorithm(s) can use the actual location attribute at least for determining a set of frequencies to scan for service. The herein-described out of service recovery algorithm(s) can use the actual location(s) specified in the predicted location attribute to determine one or more access points, networks, and/or other network entities that can provide service at the actual location(s), and then include frequencies (and related scanning rates) for the access points, networks, and/or other network entities that can provide service at the actual location(s).

For example, the herein-described out of service recovery algorithm(s) can add subsets of frequencies (and related scanning rates) for the access points, networks, and/or other network entities that can provide service at the actual location(s) using similar techniques for actual locations as was discussed above for predicted location(s) in the context of the predicted location attribute. Other techniques for determining and/or utilizing an actual location attribute are possible as well.

The herein-described out of service recovery algorithm(s) can determine values of some or all of attributes 310 of scanning context 300 as discussed above. The herein-described out of service recovery algorithm(s) can use the values of attributes 310 to determine sets of frequencies and related scanning rates as disclosed above and then mathematically, using a trained machine learning model, and/or otherwise combine the effects of attributes 310 to obtain a set of frequencies and a related set of scanning rates. Then, the herein-described out of service recovery algorithm(s) can generate and/or otherwise determine a scanning profile, such as scanning profile 250, using the obtained set of frequencies and the related set of scanning rates. Other techniques to determine scanning profiles from attributes of a scanning context are possible as well.

Figure 4:
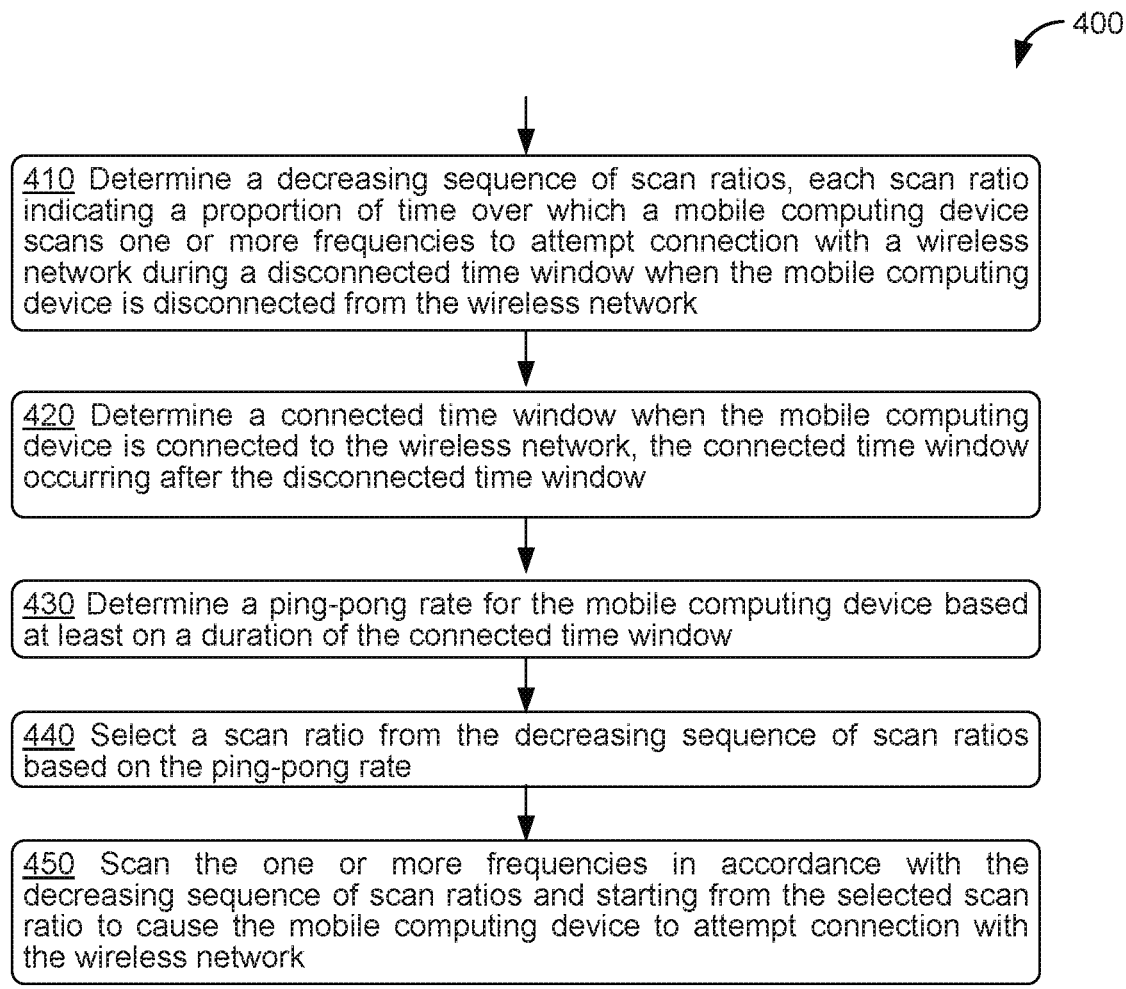
FIG. 4 is a flowchart of a method, in accordance with example embodiments.

FIG. 4 is a flowchart of method 400, in accordance with example embodiments. Method 400 can be carried out by a mobile computing device, such as, but not limited to, one or more of mobile computing devices 130, 132, 134, 136, 138, 210 and/or by a computing device, such as computing device 800, acting as a mobile computing device. Method 400 can be used by the mobile computing device as at least part of the herein-described out of service recovery algorithm(s) to obtain service for the (possibly out of service) mobile computing device.

At block 410, method 400 includes determining a decreasing sequence of scan ratios. Each scan ratio indicates a proportion of time over which a mobile computing device scans one or more frequencies to attempt connection with a wireless network. The mobile computing device may scan for service at each of the scan ratios of the sequence during a disconnected time window when the mobile computing device is disconnected from the wireless network. As an example, a first scan ratio of the sequence may indicate that the mobile computing device is scanning for service 80% of the time (and not scanning for 20% of the time), a second scan ratio of the sequence may indicate that the mobile computing device is scanning for service 60% of the time, and a third scan ratio of the sequence may indicate that the mobile computing device is scanning for service 40% of the time.

Each scan ratio may be associated with a sleep duration. Scanning for service at a chosen scan ratio may involve waiting the associated sleep duration in between consecutive scanning periods. For instance, when the scan ratio is 80%, a sleep duration of one minute may be applied between consecutive four minute scanning windows (so that the total period of time is five minutes, and the device is sleeping, or not scanning, for 20% of that time). When the scan ratio is 60%, a sleep duration of two minutes and forty seconds may be applied between consecutive four minute scanning windows. When the scan ratio is 40%, a sleep duration of six minutes may be applied between consecutive four minute scanning windows.

The sequence of scan ratios may be applied over a corresponding sequence of stages, with each stage having the same duration (e.g., one minute or five minutes or ten minutes). The sequence of stages may be associated with a stage timer. The stage timer may indicate the current stage (and therefore the current scan ratio) as well as how far through the current stage the algorithm has progressed. In further examples, different stages may have different durations. In yet further examples, the decreasing sequence of scan ratios may be associated with a continuous decreasing function rather than stages with fixed intervals. In general, by decreasing the scan ratio as the time out of service increases, a service recovery algorithm may optimize power utilization of the mobile computing device.

A sequence of stages or scan ratios may depend on scanning context information as otherwise described herein. For example, a machine learning model may be trained to generate a sequence of stages or scan ratio based on a combination of factors, including device mobility, battery information, temperature, location, and/or other user context information. When a particular scan ratio is applied during a stage, this may involve multiple different frequencies being scanned in sequence. Different scanning rates may be applied for individual frequencies. Further, multiple sequences of stages or scan ratios may be determined for different sets or database of frequencies. In particular, one sequence of stages with a first associated stage timer may be used for an acq_db database containing recently found frequencies only. A second sequence of stages with a second associated stage timer may be used for a full_band database containing all allowed frequency bands. Other arrangements for scanning different sets of frequencies are also contemplated.

At block 420, method 400 includes determining a connected time window when the mobile computing device is connected to the wireless network. The connected time window may occur after a disconnected time window. More specifically, the connected time window is a continuous period of time when the mobile computing device is in service. For instance, the connected time window may last one minute, five minutes, or ten minutes. In some examples, after the connection is sustained for a sufficiently long period of time, the mobile computing device may no longer be considered to be going frequently in and out of service, and the service recovery algorithm may end. However, if service is lost within a shorter period of time, the service recovery algorithm may continue in an effort to regain service while optimizing power utilization.

At block 430, method 400 includes determining a ping-pong rate for the mobile computing device based at least on a duration of the connected time window. The ping-pong rate is a measure indicative of the extent to which the mobile computing device is frequently going in and out of service. In general, a greater duration of the most recent connected time window may be associated with a lower ping-pong rate.

In some examples, the ping-pong rate may be determined to be high, medium, or low by categorizing the duration of the most recent connected time window into one of three classes or buckets. For instance, if the duration is less than a first threshold amount of time, the ping-pong rate may be determined to be high. If the duration is greater than the first threshold amount of time but less than a second threshold amount of time, the ping-pong rate may be determined to be medium. If the duration is greater than the second threshold amount of time, the ping-pong rate may be determined to be low. As an example, the first threshold amount of time may be one minute and the second threshold amount of time may be five minutes.

In further examples, the ping-pong rate may instead be determined by categorizing the duration of the most recent connected time window into one of two buckets, or one of more than three buckets. In yet further examples, the ping-pong rate may be determined as a continuous function of the duration of the most recent connected time window.

In additional examples, the ping-pong rate may be determined based on the durations of multiple connected time windows. For instance, instead of considering only the most recent connected time window, the durations of each of the previous two or three or five connected time windows may be considered. In such examples, the durations of each of the multiple connected time windows may be averaged together and then the average may be evaluated (e.g., categorized into one of multiple buckets) to establish the ping-pong rate. This average may be a weighted average which assigns a greater weight to more recent connected time windows.

At block 440, method 400 includes selecting a scan ratio from the decreasing sequence of scan ratios based on the ping-pong rate. The ping-pong rate may be used to determine how far back in the decreasing sequence of scan ratios used during the previous disconnected time window to rewind the scan ratio to initiate scanning in the current disconnected time window. In general, the scan ratio may be rewound further back for lower ping-pong rates. This approach prevents very short connected time windows from resetting the scan ratio too far, thereby causing inefficient excessive scanning, which may adversely affect battery lifetime. Resetting the scan ratio may involve resetting a stage timer to a particular time representing an amount of progression through a sequence of stages corresponding to the sequence of scan ratios.

In some examples, the ping-pong rate may be determined to be high, medium, or low. When the ping-pong rate is determined to be a high ping-pong rate, the selected scan ratio may be set to a most recently used scan ratio from the sequence of scan ratios. In this case, the stage timer may not be reset at all, and may instead continue from the point where service was last reacquired at the end of the previous disconnected time window. When the ping-pong rate is determined to be a medium ping-pong rate, the selected scan ratio may be set to a midpoint scan ratio between the most recently used scan ratio and an initial scan ratio from the sequence of scan ratios. In this case, the stage timer may be reset to a point directly in between the beginning and end of the previous disconnected time window. When the ping-pong rate is determined to be a low ping-pong rate, the selected scan ratio may be set to the initial scan ratio f om the sequence of scan ratios. In this case, the stage timer may be reset to the beginning of the previous disconnected time window.

In further examples, the ping-pong rate may be a numerical value, and the scan ratio may be selected from the sequence by resetting the stage timer to a particular time associated with the numerical value. For instance, the ping-pong rate may be an index value between 0 and 1, indicating how far to reset the stage timer between the beginning and end of the previous disconnected time window.

In additional examples, different scan ratios may be selected (or different associated stage timers may be reset differently) for different sets of frequencies. For instance, the scan ratio and associated stage timer may only be reset for an acq_db database containing recently found frequencies. A second scan ratio with a second associated stage timer for a full_band database containing all allowed frequencies band may not be reset, or not reset as aggressively.

The extent to which the scan ratio and associated stage timer is rewound for a particular set of frequencies may also depend on scanning context information. The scanning context information may include a mobility attribute. The scanning context information may also include a location attribute, a thermal attribute, and/or a screen attribute as well or instead. A machine learning model may be trained to process any combination of attribute information in order to determine the extent to which the scan ratio and associated stage timer is rewound.

At block 450, method 400 includes scanning the one or more frequencies in accordance with the decreasing sequence of scan ratios and starting from the selected scan ratio to cause the mobile computing device to attempt connection with the wireless network. When the scan ratio is reset, the algorithm may start with a greater scan ratio than used at the end of the previous disconnected time window. The algorithm may then again progress through decreasing scan ratios until service is reacquired.

Starting from the selected scan ratio may involve resetting a stage timer to a particular point in a particular stage from a sequence of stages followed during the previous disconnected time window. The timer may then be started to continue scanning at the scan ratio of the associated stage until the next stage in the sequence of stages is reached.

Figure 5:
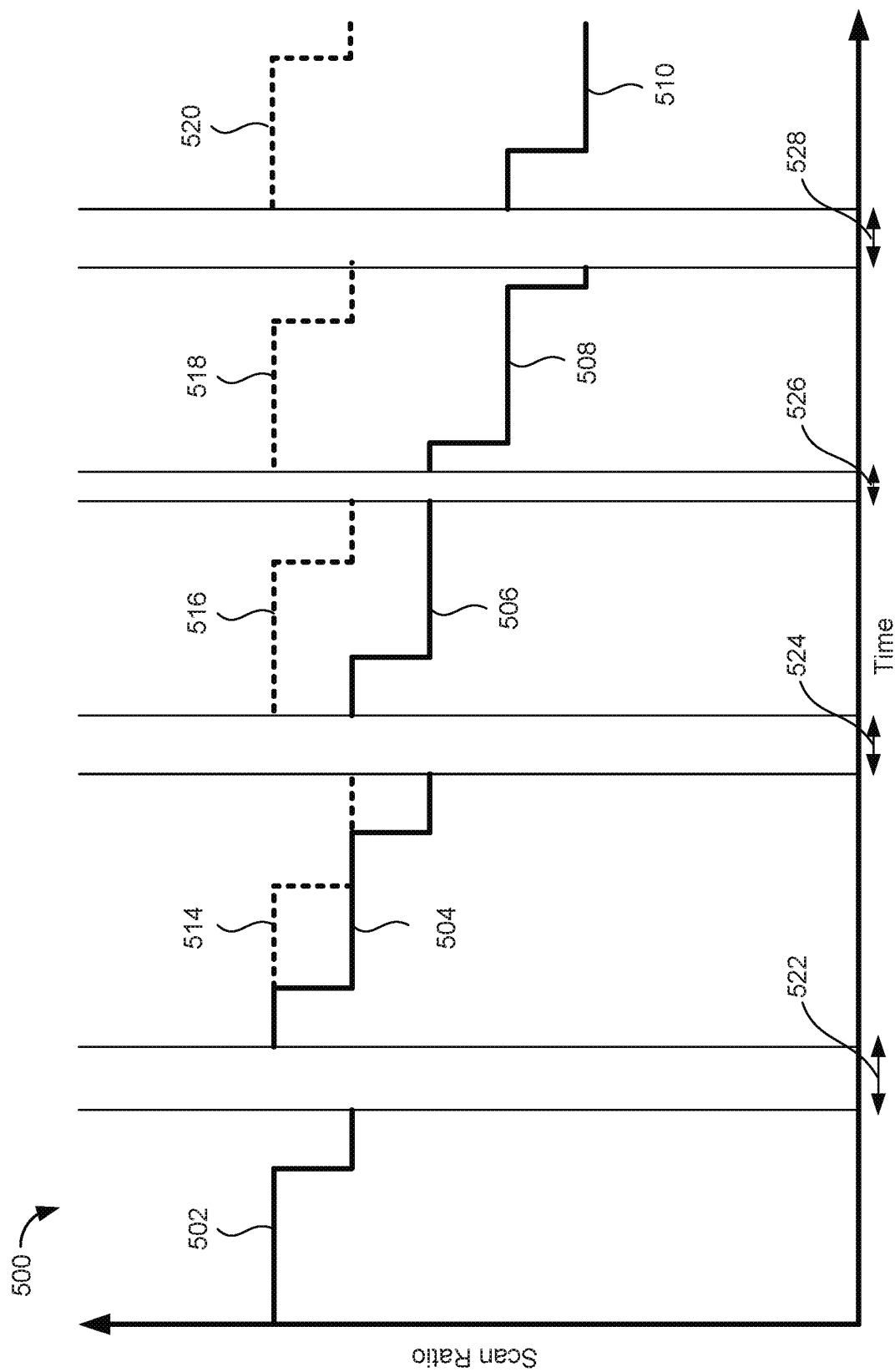
FIG. 5 depicts different scan ratios used by a mobile computing device over time, in accordance with example embodiments.

FIG. 5 depicts different scan ratios used by a mobile computing device over time, in accordance with example embodiments. More specifically, a plot 500 of scan ratios is illustrated over time. The solid line plot segments 502, 504, 506, 508, and 510 illustrate the scan ratios that may be used by a mobile computing device applying a service recovery algorithm as described herein that determines how far back to reset a scan ratio based on the ping-pong rate. The dashed line plot segments 514, 516, 518, and 520 represent how scan ratios used by a typical service recovery algorithm may diverge from a service recovery algorithm as described herein. The time windows 522, 524, 526, and 528 represent connected time windows when the mobile computing device is connected or in service (e.g., time windows when the device has reacquired service after being out of service). Notably, as FIG. 5 illustrates, in a time period where a device experiences frequent intermittent connections and disconnections, a typical service recovery algorithm as illustrated by plot segments 514, 516, 518, and 520 may use inefficient and excessive scanning by always restarting the algorithm (and fully resetting the scan ratio) every time service is reacquired.

Plot segment 502 represents a decreasing sequence of two scan ratios applied by a mobile computing device during a first disconnected time window. The device may apply a first fixed scan ratio during a first stage over a fixed duration of time. When the duration of time has elapsed, the scan ratio may be reduced to a second fixed scan ratio during a second stage. Each stage may have the same duration of time. A stage timer may count through the stages to indicate the current stage as well as the current amount of progress through the current stage. The scan ratio may continue to decrease until the device establishes a connection with the wireless network.

Time window 522 represents a first time period in which the device has established a connection with the wireless network. Once the connection is established, the device may stop scanning for service. At the end of time window 522, scanning may resume. In order to determine an initial scan ratio to use during the subsequent, second disconnected time window, a ping-pong rate may be determined based on a duration of time window 522. In this case, the duration of time window 522 may be determined to be greater than a first threshold and less than a second threshold. The ping-pong rate may therefore be determined to be a medium ping-pong rate.

Based on the ping-pong rate being classified as medium, the scan ratio may be reset to a midpoint scan ratio of the first disconnected time window in order to begin scanning during a second disconnected time window. The scan ratio applied during the second disconnected time window is represented by plot segment 504. Because the highest scan ratio was applied at a midpoint of the first disconnected time window, the scan ratio represented by plot segment 504 may initially be set to the highest scan ratio. A stage timer may also be set to the midpoint of the first disconnected time window. The stage timer indicates not only the current stage and scan ratio, but also an amount of progression through the stage. Consequently, although plot segment 504 starts at the highest scan ratio, it progresses to the next stage (and a reduced scan ratio) faster than plot segment 514. The difference between plot segment 504 and plot segment 514 represents a reduction in scanning (and thus a power saving). Plot segment 504 progresses through a decreasing sequence of three scan ratios before the second connected time window 524 is reached.

At the end of connected time window 524, a ping-pong rate may again be determined in order to determine an initial scan ratio to use during the subsequent, third disconnected time window. In this case, the ping-pong rate may also be determined to be medium based on the duration of connected time window 524. Consequently, the scan ratio (and stage timer) to use at the beginning of the third disconnected time window may be set to the midpoint scan ratio of the second disconnected time window. Alternatively, the scan ratio (and stage timer) to use at the beginning of the third disconnected time window may be set to the midpoint scan ratio between the most recently used scan ratio (the current ratio, used at the end of the second disconnected time window) and the first scan ratio of the decreasing sequence of scan ratios.

Plot segment 506 represents a sequence of two scan ratios used during the third disconnected time window. The initial scan ratio is set to a second highest scan ratio based on the scan ratio of plot segment 504 at the midpoint of the second disconnected time window. The stage timer is also reset to a midpoint of the second disconnected time window so that the scan ratio of plot segment 506 is reduced to a third highest scan ratio faster than would occur in a first instance. The difference between plot segment 516 and plot segment 506 represents additional increasing power savings from taking into account the ping-pong rate when determining the scan ratio.

Time window 526 represents a third connected time window. At the end of connected time window 526, a ping-pong rate may again be determined in order to determine an initial scan ratio to use during the fourth disconnected time window. In this case, the ping-pong rate may be determined to be high based on the short duration of connected time window 526 (e.g., the duration is less than a first threshold). Consequently, the scan ratio and stage timer may be set to be the same as the end of the third disconnected time window to begin the fourth disconnected time window. In other words, the progression through the decreasing sequence of scan ratios and stages may continue as if service reacquisition during connected time window 526 did not occur at all.

Plot segment 508 represents a decreasing sequence of three scan ratios applied during the fourth disconnected time window. The difference between plot segment 518 and plot segment 508 represents additional power savings. As reflected in FIG. 5, the power optimization benefit of considering the ping-pong rate to determine a starting scan ratio for each disconnected time window is magnified during a time period with multiple intermittent service losses and reacquisitions.

Time window 528 represents a fourth connected time window. A ping-pong rate may again be determined to be medium based on a duration of time window 528. Accordingly, the scan ratio and associated stage timer to start the fifth disconnected time window may be reset to a midpoint of the fourth disconnected time window. Alternatively, the scan ratio (and stage timer) to use at the beginning of the fifth disconnected time window may be set to the midpoint scan ratio between the most recently used scan ratio (the current ratio, used at the end of the fourth disconnected time window) and the first scan ratio of the decreasing sequence of scan ratios. Plot segment 510 represents the final sequence of two decreasing scan ratios. Notably, when taking into account the ping-pong rate, the scan ratio is ultimately reduced four levels down from the first scan ratio of the sequence. By contrast, when not taking into account the ping-pong rate, the scan ratio is only ever reduced one level down from the first scan ratio. As a result, taking into account the ping-pong rate may result in a significant reduction in scanning (e.g., by 50%) after several short connected time windows when service is reacquired and quickly lost.

Figure 6:
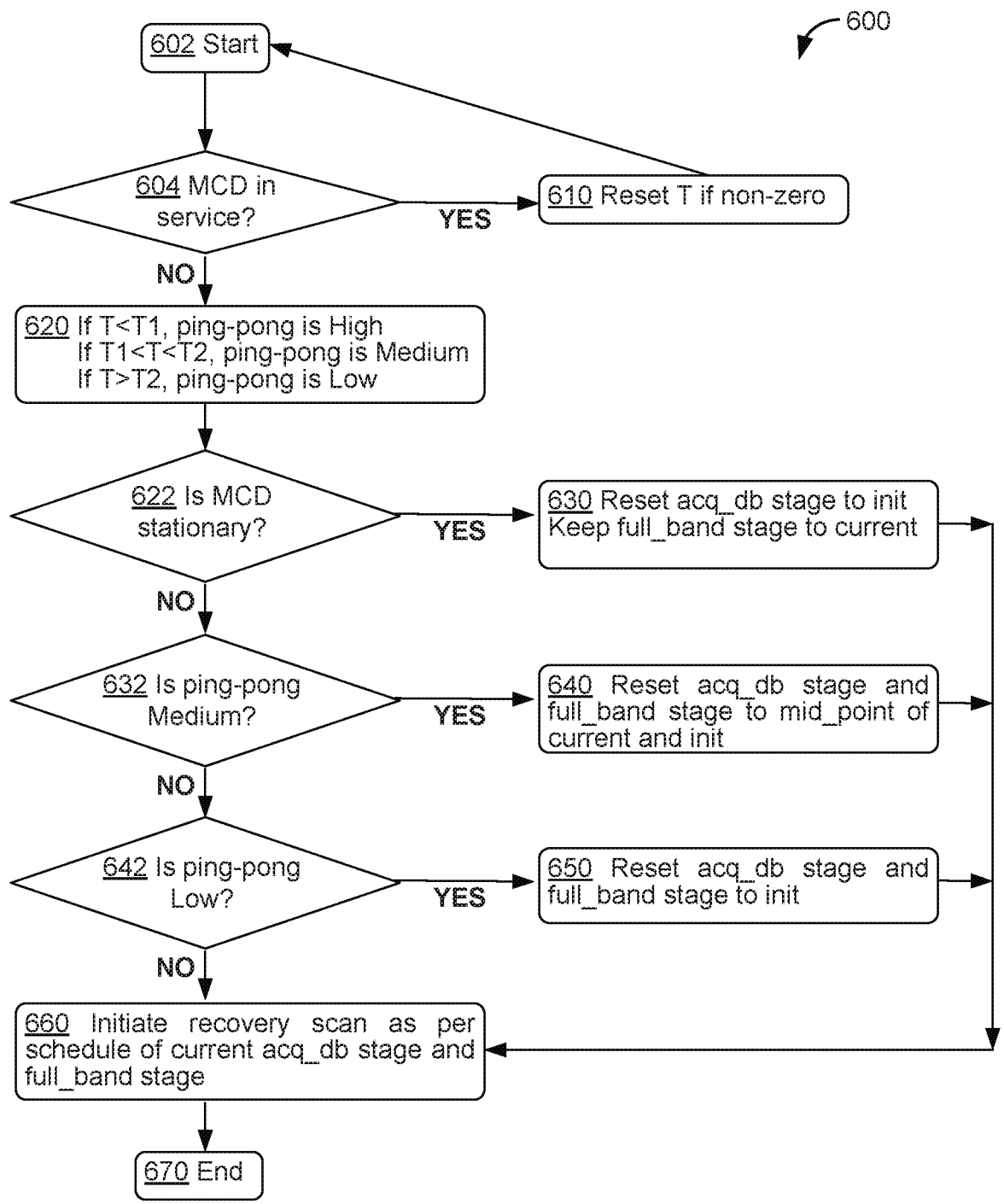
FIG. 6 is a flowchart of operations that may be carried out in accordance with example embodiments.

FIG. 6 is a flowchart of operations that may be carried out in accordance with example embodiments. The operations 600 can be carried out by a mobile computing device, such as, but not limited to, one or more of mobile computing devices 130, 132, 134, 136, 138, 210 and/or by a computing device, such as computing device 800, acting as a mobile computing device. The operations 600 can be used by the mobile computing device as at least part of the herein-described out of service recovery algorithm(s) to obtain service for the (possibly out of service) mobile computing device. In some examples, the operations 600 can be used in combination with method 400 of FIG. 4. The operations 600 of FIG. 6 illustrate an example of incorporation of scanning context (specifically, device mobility) into a service recovery algorithm. In further examples, device mobility may be incorporated in different ways and/or different aspects of scanning context may be incorporated as well or instead.

Operations 600 may start at block 602 when a service recovery algorithm is initially run. At block 604, a check may be performed to determine whether a mobile computing device is currently in service (e.g., connected to a wireless network). If the mobile computing device is determined to be in service, a timer T may initially be reset to zero if T is non-zero at block 610. The timer T then represents a duration of a current connected time window. The timer T may increase as long as the mobile computing device stays in service.

When it is determined at block 604 that the mobile computing device is no longer in service, operations 600 progress to block 620. At block 620, the timer T of the most recent connected time window is evaluated in order to determine a ping-pong rate. In this case, the ping-pong rate is determined to be high, medium, or low by comparing T to a first threshold time T1 and a second threshold time T2. If T<T1, the ping-pong rate is determined to be high. If T1<T<T2, the ping-pong rate is determined to be medium. If T>12, the ping-pong rate is determined to be low.

The operations 600 may then continue to block 622, where a determination is made as to whether the mobile computing device is stationary. A mobile computing device may be considered stationary when the device is at a same coarse location (e.g., in a cell boundary or RF constrained area). In this scenario, the same cell may get reacquired and then lost again. To identify this situation, several factors may be considered, including device sensor information indicating low mobility, cell identification information indicating that the same cell is being reacquired, and/or the measured signal strength of other detected cells being similar (for cells that are found but do not meet acquisition criteria). Another variation of this situation is when the device is reacquiring one of a few available cells.

If at block 622 the device is considered to be stationary based on any combination of these factors, operations 600 continue to block 630. At block 630, the scan ratio and associated stage timer may only be reset to the start of the previous disconnected time window for an acq_db stage containing recently found frequencies. Alternatively, depending on the thresholds applied to the ping-pong rate, the stage and scan ratio and associated stage timer may be reset to the first stage of the sequence for the acq_db recently found frequencies. The scan ratio and associated stage timer for a full_band stage containing all allowed frequencies band may not be reset. Based on block 630, scanning for recently found frequencies will be prioritized if the device is considered to be stationary (for example, because service can likely be found on the same frequency as previously used); battery performance may therefore be improved because less power is required to scan the recently found frequencies as compared to a full scan of all frequencies.

By contrast, at block 622, the device may instead be considered to not be stationary. This scenario typically happens when the device (or a user with the device) is moving so that the device encounters different cells. This scenario may be identified by factors such as the device sensor information indicating high mobility, cell identification information of an acquired cell being different than an earlier acquired cell, and/or different cells being found or the signal strength of found cells varying significantly.

If at block 622 the device is considered to not be stationary based on any combination of these factors, operations 600 continue to block 632 to evaluate the ping-pong rate determined based on timer T. If at block 632, the ping-pong rate is determined to be medium, the scan ratio and associated stage timer for both the acq_db stage and the full_band stage may be reset to a midpoint between the most recently used scan ratio and an initial scan ratio of the decreasing sequence of scan ratios. The midpoint may be the midpoint between the starting and ending point of the previous disconnected time window at block 640.

Otherwise, if at block 642, the ping-pong rate is determined to be low, the scan ratio and associated stage timer for both the acq_db stage and the full_band stage may be reset such that the selected scan ratio for the algorithm is an initial scan ratio of the decreasing sequence of scan ratios. The selected scan ratio may be reset to the start of the previous disconnected time window at block 650. Otherwise, the ping-pong rate is determined to be high and no reset of the scan ratio or associated stage timer is performed.

Operations 600 then continue at block 660, where a recovery scan is initiated as per the schedule of the current acq_db stage and full_band stage after any reset of scan ratios and stage timers. The service recovery algorithm ends at block 670.

Figure 7:
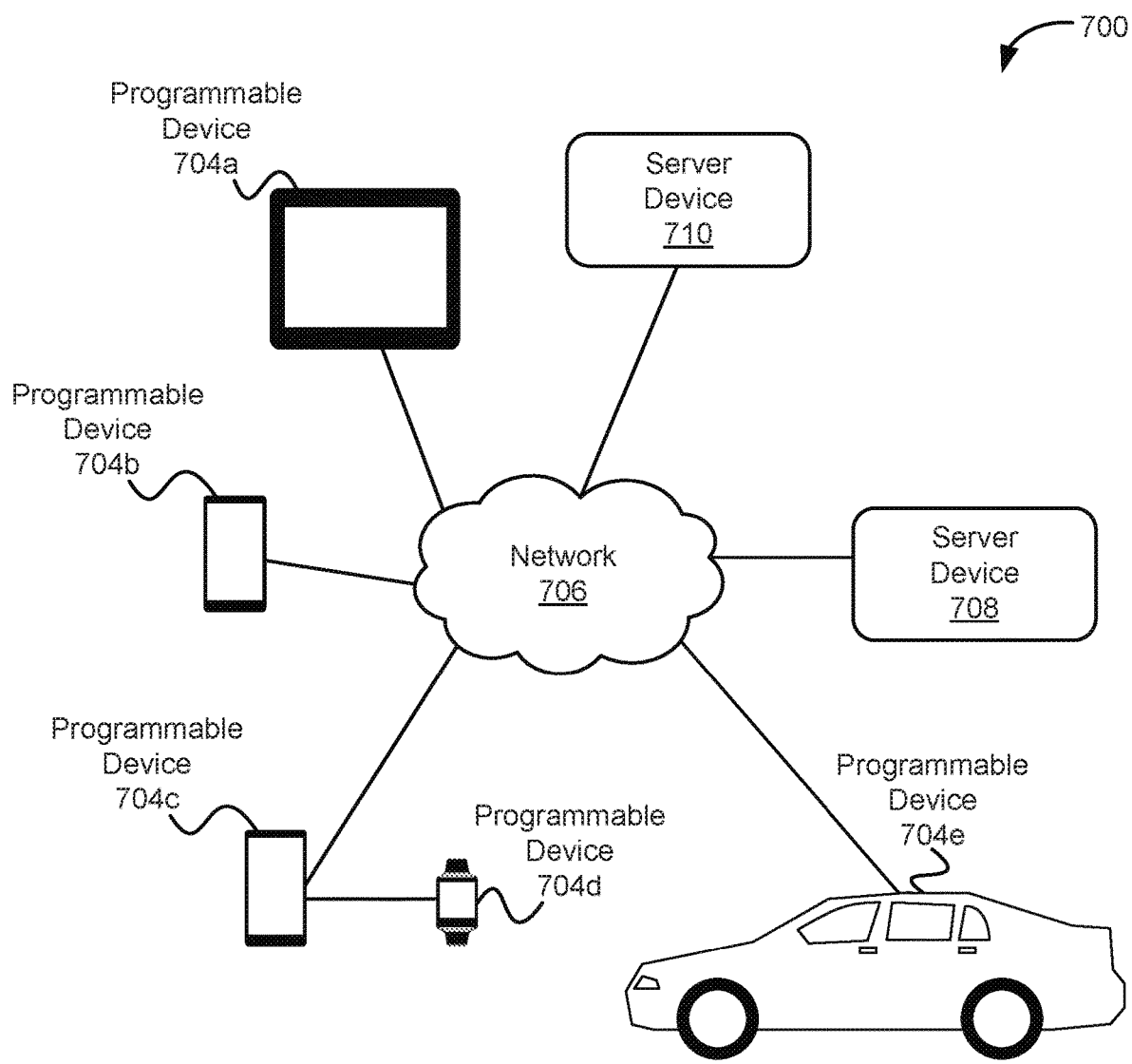
FIG. 7 depicts a distributed computing architecture, in accordance with example embodiments.

FIG. 7 depicts distributed computing architecture 700, in accordance with example embodiments. Distributed computing architecture 700 includes server devices 708, 710 that are configured to communicate, via network 706, with programmable devices 704a, 704b, 704c, 704d, 704e. Network 706 may correspond to a local area network (LAN), a wide area network (WAN), a WLAN, a WWAN, a corporate intranet, the public Internet, or any other type of network configured to provide a communications path between networked computing devices. Network 706 may also correspond to a combination of one or more LANs. WANs, corporate intranets, and/or the public Internet.

Although FIG. 7 only shows five programmable devices, distributed application architectures may serve tens, hundreds, or thousands of programmable devices. Moreover, programmable devices 704a, 704b, 704c, 704d, 704e (or any additional programmable devices) may be any sort of computing device, such as an ordinary laptop computer, desktop computer, wearable computing device, mobile computing device, head-mountable device (HMD), network terminal, wireless communication device (e.g., a smart phone or cell phone), and so on. In some examples, such as illustrated by programmable devices 704a, 704b, 704c, 704e, programmable devices can be directly connected to network 706. In other examples, such as illustrated by programmable device 704d, programmable devices can be indirectly connected to network 706 via an associated computing device, such as programmable device 704c. In this example, programmable device 704c can act as an associated computing device to pass electronic communications between programmable device 704d and network 706. In other examples, such as illustrated by programmable device 704e, a computing device can be part of and/or inside a vehicle, such as a car, a truck, a bus, a boat or ship, an airplane, etc. In other examples not shown in FIG. 7, a programmable device can be both directly and indirectly connected to network 706.

Server devices 708, 710 can be configured to perform one or more services, as requested by programmable devices 704a-704e. For example, server device 708 and/or 710 can provide content to programmable devices 704a-704e. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well.

As another example, server device 708 and/or 710 can provide programmable devices 704a-704e with access to software for database, search, computation, graphical, audio, video, World Wide Web/Internet utilization, and/or other functions. Many other examples of server devices are possible as well.

Figure 8:
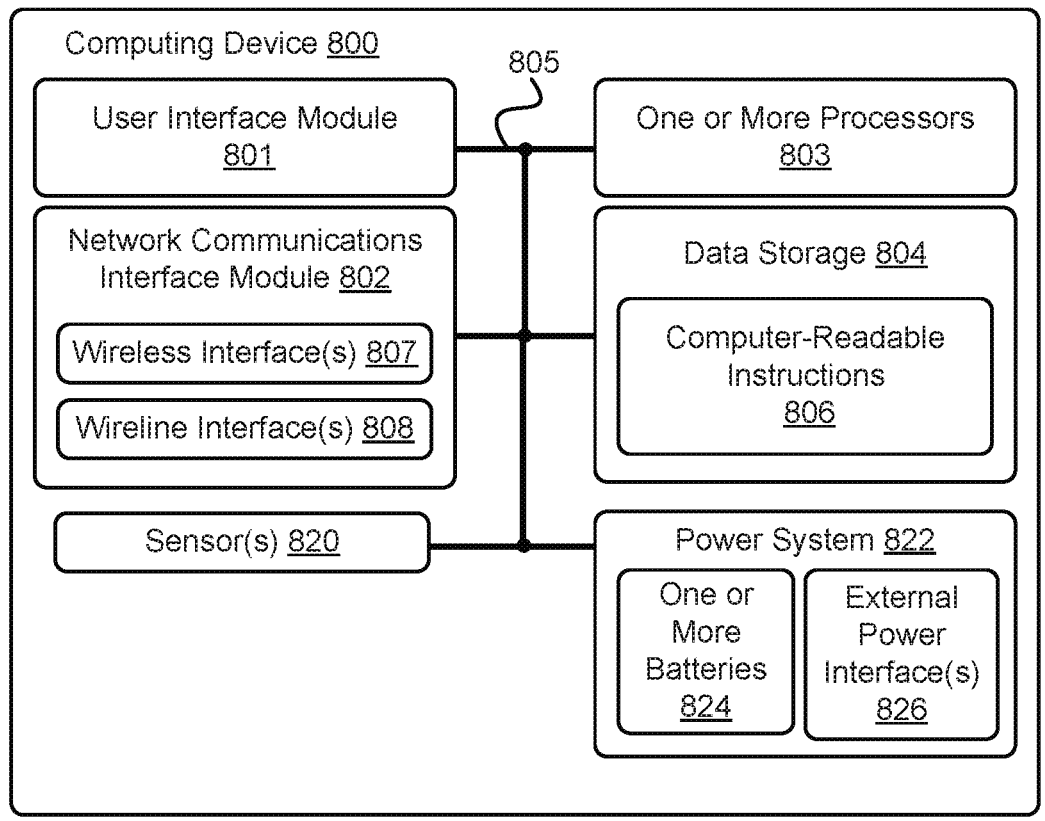
FIG. 8 is a functional block diagram of an example computing device, in accordance with example embodiments.

FIG. 8 is a functional block diagram of an example computing device 800, in accordance with example embodiments. In particular, computing device 800 shown in FIG. 8 can be configured to perform at least one function of the herein-described out of service recovery algorithm(s), an access point, a mobile computing device, access points 110, 112, 120, 122, 124, 220, 222, 224, mobile computing device 130, 132, 134, 136, 138, 210, scanning profile 250, scanning context 300, distributed computing architecture 700, and/or at least one function related to method 400 and/or operations 600.

Computing device 800 may include a user interface module 801, a network communication interface module 802, one or more processors 803, data storage 804, one or more sensors 820, and power system 822, all of which may be linked together via a system bus, network, or other connection mechanism 805.

User interface module 801 can be operable to send data to and/or receive data from external user input/output devices. For example, user interface module 801 can be configured to send and/or receive data to and/or from user input devices such as a touch screen, a computer mouse, a keyboard, a keypad, a touch pad, a track ball, a joystick, a camera, a voice recognition module, and/or other similar devices. User interface module 801 can also be configured to provide output to user display devices, such as one or more cathode ray tubes (CRT), liquid crystal displays, light emitting diodes (LEDs), displays using digital light processing (DLP) technology, printers, light bulbs, and/or other similar devices, either now known or later developed. User interface module 801 can also be configured to generate audible outputs, such as a speaker, speaker jack, audio output port, audio output device, earphones, and/or other similar devices. User interface module 801 can further be configured with one or more haptic devices that can generate haptic outputs, such as vibrations and/or other outputs detectable by touch and/or physical contact with computing device 800. In some examples, user interface module 801 can be used to provide a graphical user interface (GUI) for utilizing computing device 800.

Network communications interface module 802 can include one or more wireless interfaces 807 and/or one or more wireline interfaces 808 that are configurable to communicate via a network. Wireless interface(s) 807 can include one or more wireless transmitters, receivers, and/or transceivers, such as a Bluetooth™ transceiver, a Zigbee® transceiver, a Wi-Fi™ transceiver, a WiMAX™ transceiver, and/or other similar type of wireless transceiver configurable to communicate via a wireless network. Wireline interface(s) 808 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some examples, network communications interface module 802 can be configured to provide reliable, secured, and/or authenticated communications. For each communication described herein, information for ensuring reliable communications (e.g., guaranteed message delivery) can be provided, perhaps as part of a message header and/or footer (e.g., packet/message sequencing information, encapsulation headers and/or footers, size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, Data Encryption Standard (DES), Advanced Encryption Standard (AES), a Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure (and then decrypt/decode) communications.

One or more processors 803 can include one or more general purpose processors, and/or one or more special purpose processors (e.g., digital signal processors, graphics processing units, application specific integrated circuits, etc.). One or more processors 803 can be configured to execute computer-readable instructions 806 that are contained in data storage 804 and/or other instructions as described herein.

Data storage 804 can include one or more computer-readable storage media that can be read and/or accessed by at least one of one or more processors 803. The one or more computer-readable storage media can include volatile and/or non-volatile storage components, such as optical, magnetic, organic or other memory or disc storage, which can be integrated in whole or in part with at least one of one or more processors 803. In some examples, data storage 804 can be implemented using a single physical device (e.g., one optical, magnetic, organic or other memory or disc storage unit), while in other examples, data storage 804 can be implemented using two or more physical devices.

Data storage 804 can include computer-readable instructions 806 and perhaps additional data. In some examples, data storage 804 can additionally include storage required to perform at least part of the herein-described methods, scenarios, and techniques and/or at least part of the functionality of the herein-described devices and networks.

In some examples, computing device 800 can include one or more sensors 820. Sensors 820 can be configured to measure conditions within computing device 800 and/or conditions in an environment of computing device 800 and provide data about these conditions. For example, sensors 820 can include one or more of: (i) sensors for obtaining data about computing device 800, such as, but not limited to, a thermometer measuring computing device 800's temperature, a battery sensor for measuring power of one or more batteries of power system 822, and/or other sensors measuring conditions of computing device 800; (ii) an identification sensor to identify other objects and/or devices, such as, but not limited to, a Radio Frequency Identification (RFID) reader, proximity sensor, one-dimensional barcode reader, two-dimensional barcode (e.g., Quick Response (QR) code) reader, and a laser tracker, where the identification sensors can be configured to read identifiers, such as RFID tags, barcodes, QR codes, and/or other devices and/or object configured to be read and provide at least identifying information; (iii) sensors to measure locations and/or movements of computing device 800, such as, but not limited to, a tilt sensor, a gyroscope, an accelerometer, a Doppler sensor, a GPS device, a sonar sensor, a radar device, a laser-displacement sensor, and a compass; (iv) an environmental sensor to obtain data indicative of an environment of computing device 800, such as, but not limited to, an infrared sensor, an optical sensor, a light sensor, a camera, a biosensor, a capacitive sensor, a touch sensor, a temperature sensor, a wireless sensor, a radio sensor, a movement sensor, a microphone, a sound sensor, an ultrasound sensor and/or a smoke sensor; and/or (v) a force sensor to measure one or more forces (e.g., inertial forces and/or G-forces) acting about computing device 800, such as, but not limited to one or more sensors that measure: forces in one or more dimensions, torque, ground force, friction, and/or a zero moment point (ZMP) sensor that identifies ZMPs and/or locations of the ZMPs. Many other examples of sensors 820 are possible as well.

Power system 822 can include one or more batteries 824 and/or one or more external power interfaces 826 for providing electrical power to computing device 800. Each battery of the one or more batteries 824 can, when electrically coupled to the computing device 800, act as a source of stored electrical power for computing device 800. One or more batteries 824 of power system 822 can be configured to be portable; e.g., readily transportable by a person carrying computing device 800 with the one or more batteries. Some or all of one or more batteries 824 can be readily removable from computing device 800. In other examples, some or all of one or more batteries 824 can be internal to computing device 800, and so may not be readily removable from computing device 800. Some or all of one or more batteries 824 can be rechargeable; for example, a rechargeable battery can be recharged via a wired connection between the battery and another power supply; e.g., one or more power supplies that are external to computing device 800 that are connected to computing device 800 via the one or more external power interfaces. In other examples, some or all of one or more batteries 824 can be non-rechargeable batteries.

One or more external power interfaces 826 of power system 822 can include one or more wired-power interfaces, such as a USB cable and/or a power cord, that enable wired electrical power connections to one or more power supplies that are external to computing device 800. One or more external power interfaces 826 can include one or more wireless power interfaces, such as a Qi wireless charger, that enable wireless electrical power connections, such as via a Qi wireless charger, to one or more external power supplies. Once an electrical power connection is established to an external power source using one or more external power interfaces 826, computing device 800 can draw electrical power from the external power source the established electrical power connection. In some examples, power system 822 can include related sensors; e.g., battery sensors associated with the one or more batteries, electrical power sensors.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are provided for explanatory purposes and are not intended to be limiting, with the true scope being indicated by the following claims.

The invention claimed is:

1. A computer-implemented method, comprising:
    determining a decreasing sequence of scan ratios, each scan ratio indicating a proportion of time over which a mobile computing device scans one or more frequencies to attempt connection with a wireless network during a disconnected time window when the mobile computing device is disconnected from the wireless network;
    determining a connected time window when the mobile computing device is connected to the wireless network, the connected time window occurring after the disconnected time window;
    determining a ping-pong rate for the mobile computing device based at least on a duration of the connected time window;
    selecting a scan ratio from the decreasing sequence of scan ratios based on the ping-pong rate; and
    scanning the one or more frequencies in accordance with the decreasing sequence of scan ratios and starting from the selected scan ratio to cause the mobile computing device to attempt connection with the wireless network.

2. The method of claim 1, wherein when the duration is less than a first threshold, the ping-pong rate is determined to be a high ping-pong rate and the selected scan ratio is a most recently used scan ratio from the decreasing sequence of scan ratios.

3. The method of claim 2, wherein when the duration is greater than the first threshold and less than a second threshold, the ping-pong rate is determined to be a medium ping-pong rate and the selected scan ratio is a midpoint scan ratio between the most recently used scan ratio and an initial scan ratio from the decreasing sequence of scan ratios.

4. The method of claim 3, wherein when the duration is greater than the second threshold, the ping-pong rate is determined to be a low ping-pong rate and the selected scan ratio is the initial scan ratio from the decreasing sequence of scan ratios.

5. The method of claim 1, wherein each scan ratio is associated with a sleep duration, and wherein scanning the one or more frequencies starting from the selected scan ratio comprises waiting the associated sleep duration in between consecutive scanning periods.

6. The method of claim 1, wherein the one or more frequencies comprise a plurality of frequencies, wherein scanning the one or more frequencies comprises scanning each frequency of the plurality of frequencies in sequence.

7. The method of claim 1, wherein the decreasing sequence of scan ratios corresponds to a sequence of stages, wherein scanning the one or more frequencies in accordance with the decreasing sequence of scan ratios and starting from the selected scan ratio comprises resetting a stage timer that progresses through the sequence of stages.

8. The method of claim 1, wherein determining the decreasing sequence of scan ratios is based on a scanning context.

9. The method of claim 8, wherein selecting the scan ratio is further based on the scanning context.

10. The method of claim 8, wherein the scanning context comprises at least one of a mobility attribute, a location attribute, a thermal attribute, or a screen attribute.

11. The method of claim 1, wherein the ping-pong rate is further based on at least one duration of at least one previous connected time window.

12. The method of claim 11, where the ping-pong rate is based on a weighted average of the duration of the connected time window and the at least one duration of the at least one previous connected time window, wherein weights for the weighted average are greater for more recent time windows.

13. The method of claim 1, wherein the decreasing sequence of scan ratios is a first sequence, the method further comprising:
    determining a second decreasing sequence of scan ratios, each scan ratio indicating a proportion of time over which the mobile computing device scans one or more different frequencies to attempt connection with the wireless network during the disconnected time window;
    selecting a second scan ratio from the second sequence of scan ratios based on the ping-pong rate; and
    scanning one or more different frequencies in accordance with the second sequence of scan ratios and starting from the second selected scan ratio to cause the mobile computing device to attempt connection with the wireless network.

14. The method of claim 13, wherein the one or more frequencies are selected from a set containing recently acquired frequencies, wherein the one or more different frequencies are selected from a set containing a full band of frequencies.

15. The method of claim 14, further comprising determining a mobility attribute of the mobile computing device, wherein the decreasing sequence of scan ratios and the second decreasing sequence of scan ratios are based on the mobility attribute.

16. The method of claim 15, wherein when the mobility attribute indicates high mobility and the ping-pong rate is determined to be a medium ping-pong rate, the selected scan ratio is a first midpoint scan ratio between a most recently used scan ratio and an initial scan ratio from the decreasing sequence of scan ratios and the second selected scan ratio is a second midpoint scan ratio between a most recently used scan ratio and an initial scan ratio from the second decreasing sequence of scan ratios.

17. A mobile computing device, comprising:
    one or more processors; and
    one or more computer readable media having computer-readable instructions stored thereon that, when executed by the one or more processors, cause the mobile computing device to carry out functions comprising:
    determining a decreasing sequence of scan ratios, each scan ratio indicating a proportion of time over which the mobile computing device scans one or more frequencies to attempt connection with a wireless network during a disconnected time window when the mobile computing device is disconnected from the wireless network;
    determining a connected time window when the mobile computing device is connected to the wireless network, the connected time window occurring after the disconnected time window;
    determining a ping-pong rate for the mobile computing device based at least on a duration of the connected time window;

selecting a scan ratio from the decreasing sequence of scan ratios based on the ping-pong rate; and scanning the one or more frequencies in accordance with the decreasing sequence of scan ratios and starting from the selected scan ratio to cause the mobile computing device to attempt connection with the wireless network.

18. An article of manufacture comprising one or more non-transitory computer readable media having computer-readable instructions stored thereon that, when executed by one or more processors of a mobile computing device, cause the mobile computing device to carry out functions that comprise:

determining a decreasing sequence of scan ratios, each scan ratio indicating a proportion of time over which the mobile computing device scans one or more frequencies to attempt connection with a wireless network during a disconnected time window when the mobile computing device is disconnected from the wireless network;

determining a connected time window when the mobile computing device is connected to the wireless network, the connected time window occurring after the disconnected time window;

determining a ping-pong rate for the mobile computing device based at least on a duration of the connected time window;

selecting a scan ratio from the decreasing sequence of scan ratios based on the ping-pong rate; and scanning the one or more frequencies in accordance with the decreasing sequence of scan ratios and starting from the selected scan ratio to cause the mobile computing device to attempt connection with the wireless network.

* * * * *